(12) United States Patent
Gentili

(10) Patent No.: US 9,629,301 B2
(45) Date of Patent: Apr. 25, 2017

(54) DIRECT DRIVE SEED METERING DEVICE

(71) Applicant: Jorge Alberto Gentili, Santa Fe (AR)

(72) Inventor: Jorge Alberto Gentili, Santa Fe (AR)

( * ) Notice: Subject to any disclaimer, the term of this patent is extended or adjusted under 35 U.S.C. 154(b) by 0 days.

(21) Appl. No.: 15/284,964

(22) Filed: Oct. 4, 2016

(65) Prior Publication Data

US 2017/0020059 A1   Jan. 26, 2017

Related U.S. Application Data

(62) Division of application No. 14/611,659, filed on Feb. 2, 2015, now Pat. No. 9,491,901.

(60) Provisional application No. 62/001,867, filed on May 22, 2014.

(51) Int. Cl.
  *A01C 7/04*   (2006.01)
  *A01C 19/02*   (2006.01)
  *A01C 7/16*   (2006.01)

(52) U.S. Cl.
  CPC .............. *A01C 7/046* (2013.01); *A01C 7/163* (2013.01); *A01C 19/02* (2013.01)

(58) Field of Classification Search
  CPC ........... A01C 19/00; A01C 19/02; A01C 7/04; A01C 7/042; A01C 7/044; A01C 7/046
  USPC .................................................. 111/179–185
  See application file for complete search history.

(56) References Cited

U.S. PATENT DOCUMENTS

| | | | |
|---|---|---|---|
| 6,247,417 B1 * | 6/2001 | Heimbuch | A01C 7/04 111/178 |
| 6,481,647 B1 * | 11/2002 | Keaton | A01C 7/20 239/654 |
| 6,932,236 B2 | 8/2005 | Ven Huizen | |
| 7,140,311 B2 * | 11/2006 | Brueggen | A01C 7/042 111/200 |
| 7,462,967 B2 | 12/2008 | Maruyama | |
| 7,490,565 B2 | 2/2009 | Holly | |
| 7,617,785 B2 * | 11/2009 | Wendte | A01C 7/046 111/185 |
| 8,166,892 B2 * | 5/2012 | Forbes | B61D 7/02 105/396 |
| 8,166,896 B2 | 5/2012 | Shoup | |
| 8,336,471 B2 | 12/2012 | Gilstring | |
| 8,375,873 B2 | 2/2013 | Nelson | |
| 8,770,121 B2 * | 7/2014 | Bragatto | A01C 7/046 111/185 |
| 8,850,998 B2 | 10/2014 | Garner | |

(Continued)

FOREIGN PATENT DOCUMENTS

WO   WO 2012/142607 A1   10/2012

*Primary Examiner* — John G Weiss
(74) *Attorney, Agent, or Firm* — Muncy, Geissler, Olds & Lowe, P.C.

(57) ABSTRACT

A direct drive seed metering device for a row crop sowing machine with a seed metering disc rotatable about a central shaft having a plurality of seed capturing and retaining holes for capturing and retaining the seeds and laying them in a controlled manner in a furrow. The seed disc has a flexible sealing member attached to an inner wall of the housing and sealingly pressed against a face of the metering disc thereby forming a vacuum chamber by a the vacuum generator that lowers the air pressure on a face of the metering disc so as to capture and retain the seeds. The vacuum chamber is created by the vacuum generator being fluidly connected to the chamber through a hollow shaft of a drive motor and through a perforated hollow hub.

16 Claims, 18 Drawing Sheets

(56) References Cited

U.S. PATENT DOCUMENTS

| | | |
|---|---|---|
| 8,925,471 B2 | 1/2015 | Adams |
| 2004/0237396 A1 | 12/2004 | Castillo |
| 2005/0204972 A1* | 9/2005 | Eben .................. A01C 7/046 |
| | | 111/185 |
| 2014/0182496 A1 | 7/2014 | Adams |
| 2014/0352588 A1* | 12/2014 | Bergere ................ A01C 7/046 |
| | | 111/185 |
| 2015/0163990 A1 | 6/2015 | Audigie |
| 2015/0181798 A1* | 7/2015 | Schumacher .......... A01C 7/046 |
| | | 111/185 |

* cited by examiner

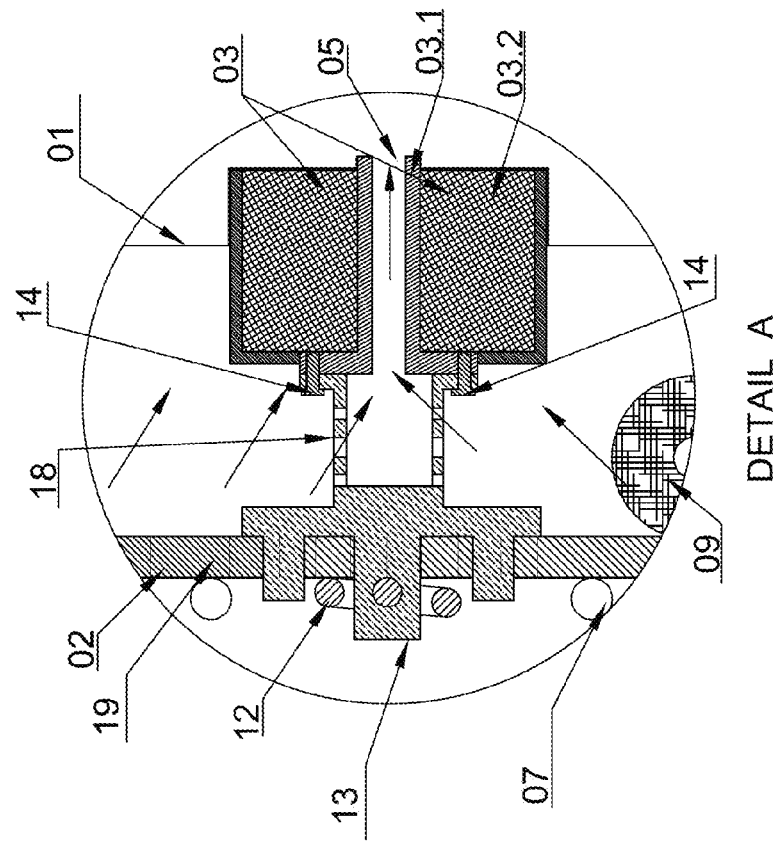
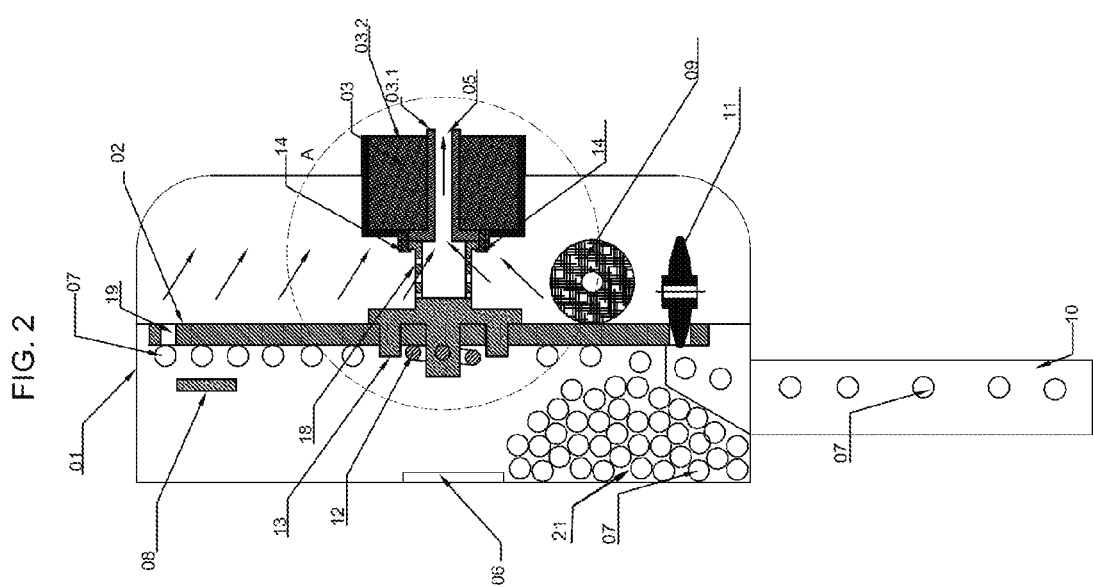
FIG. 2

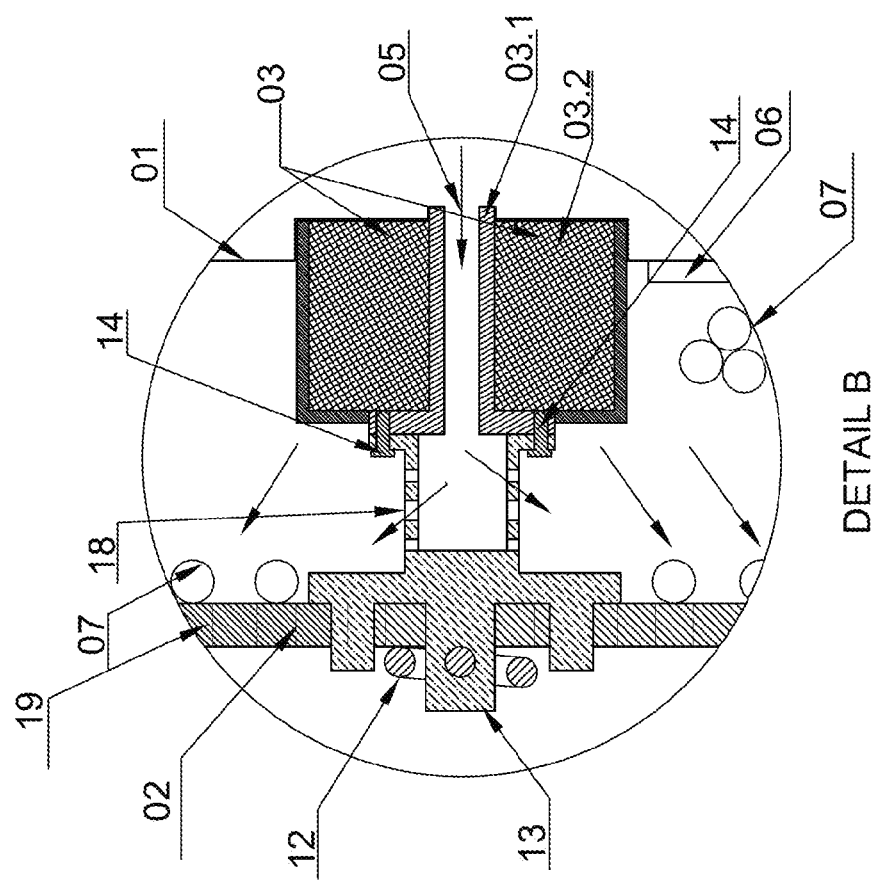
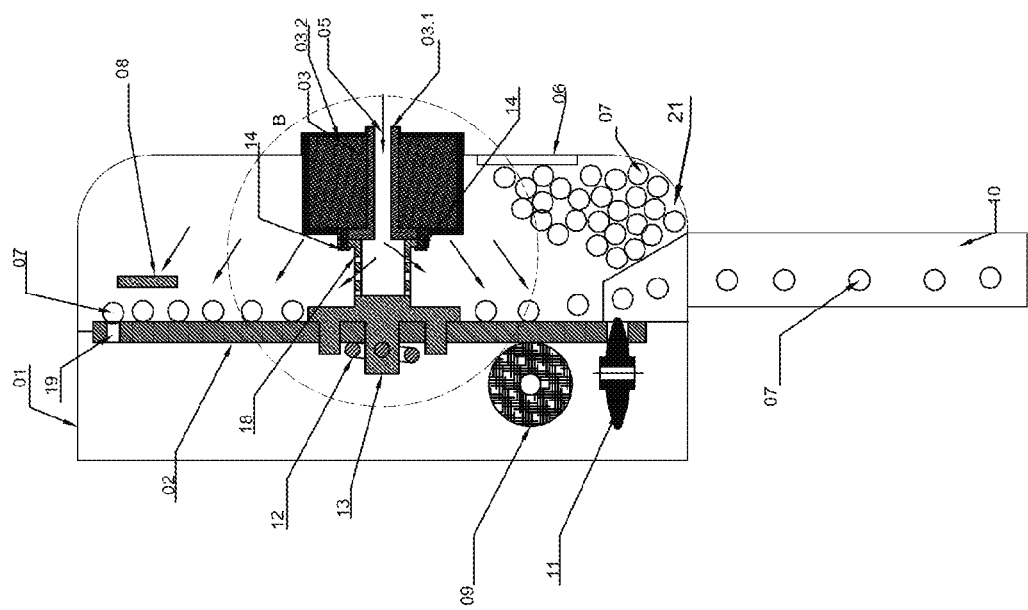
FIG. 4

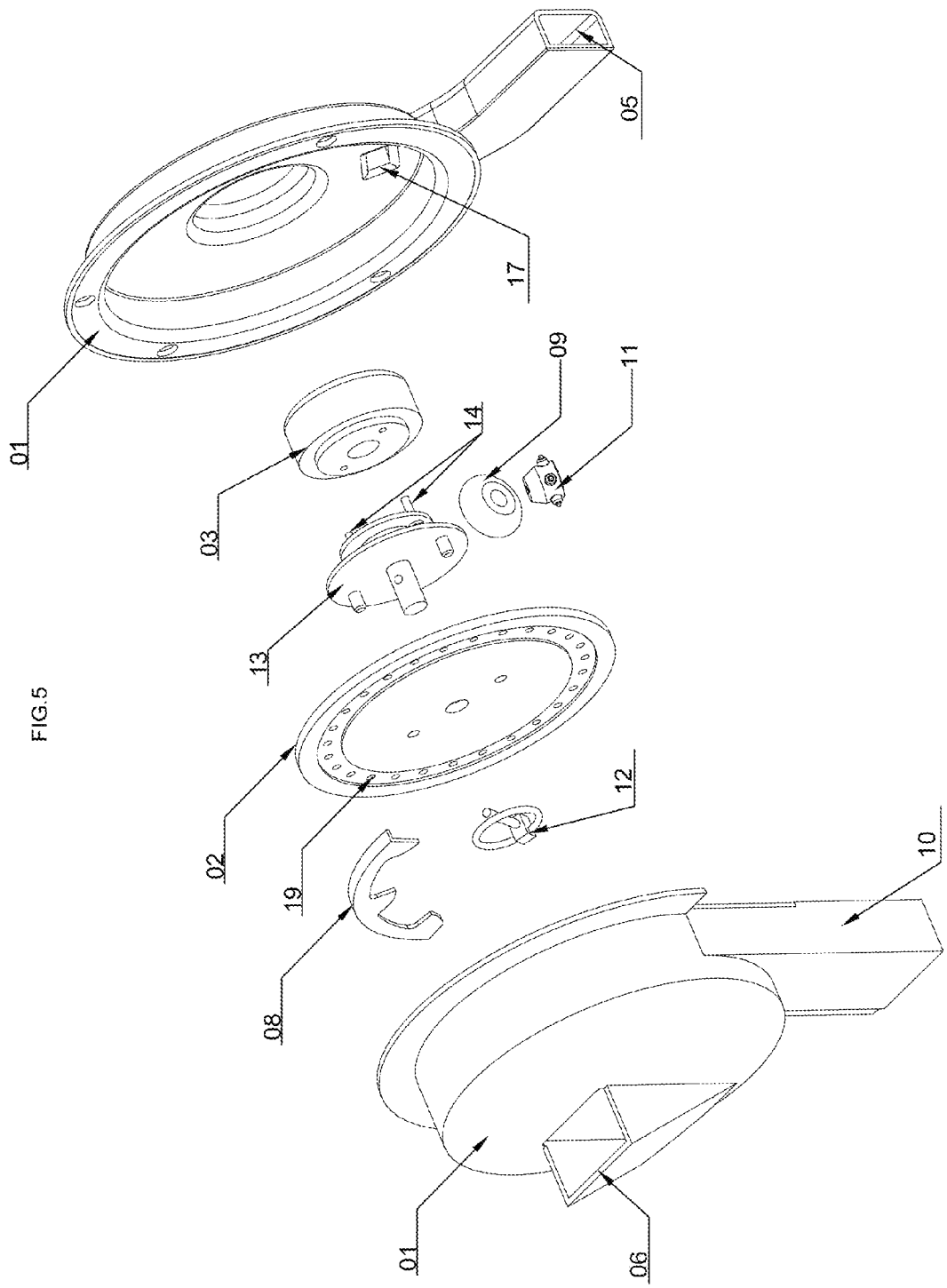

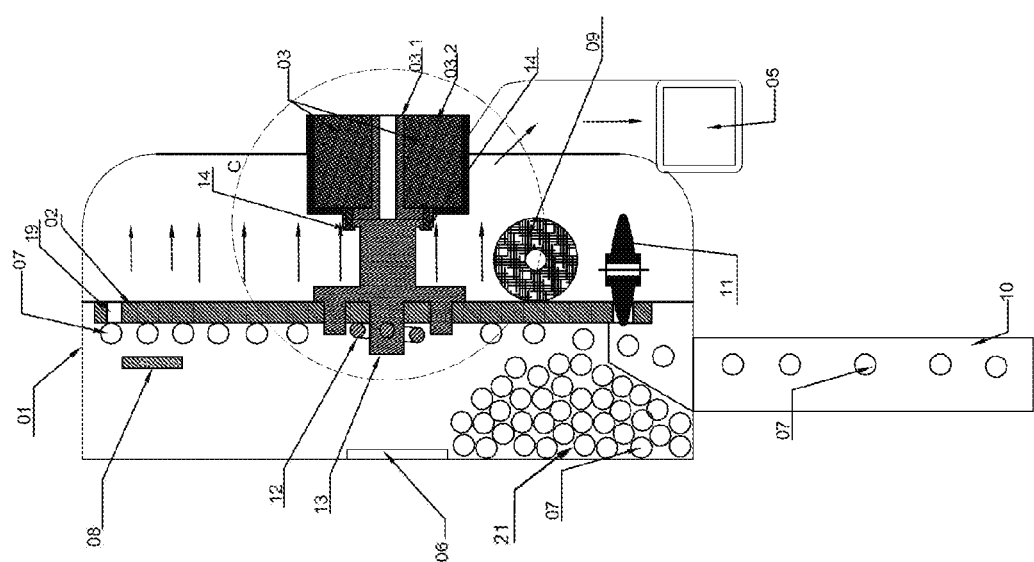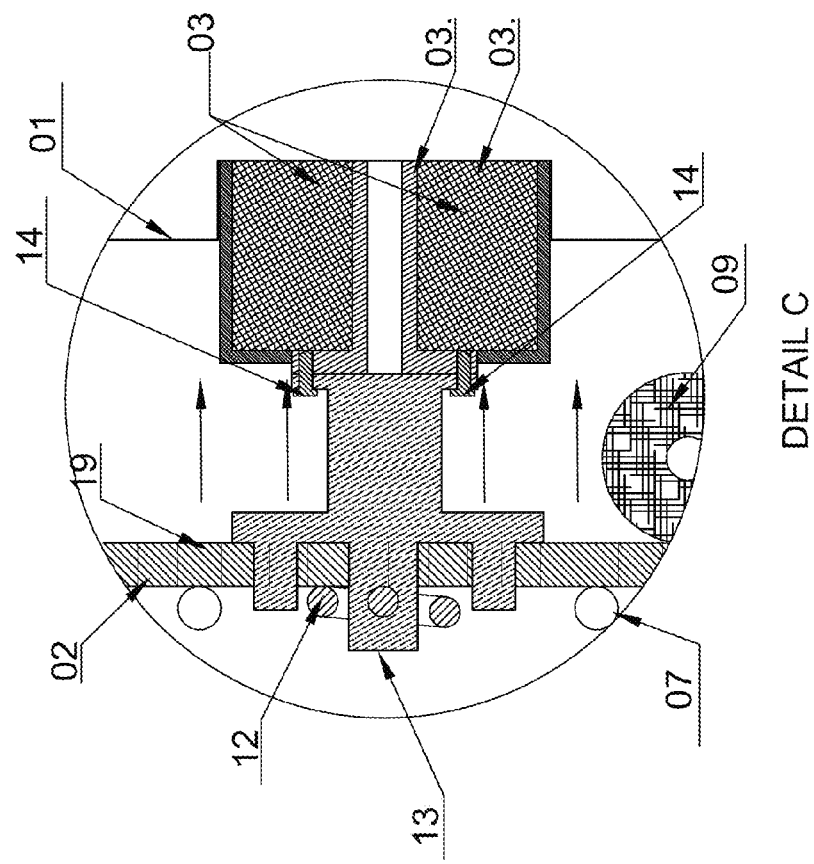

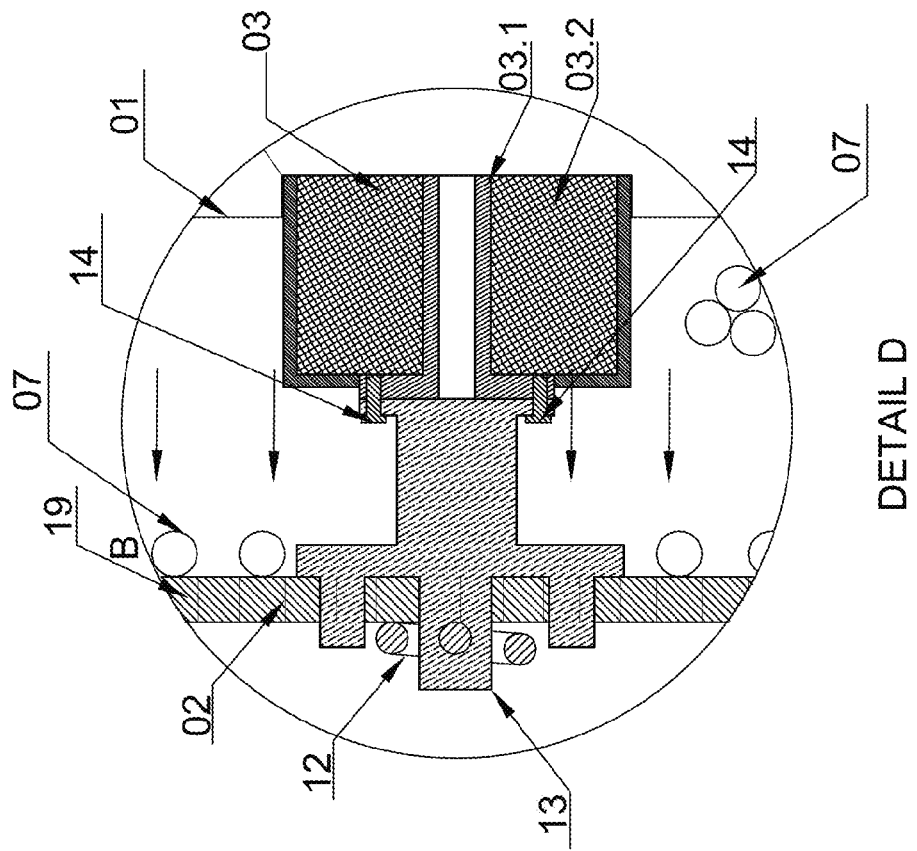
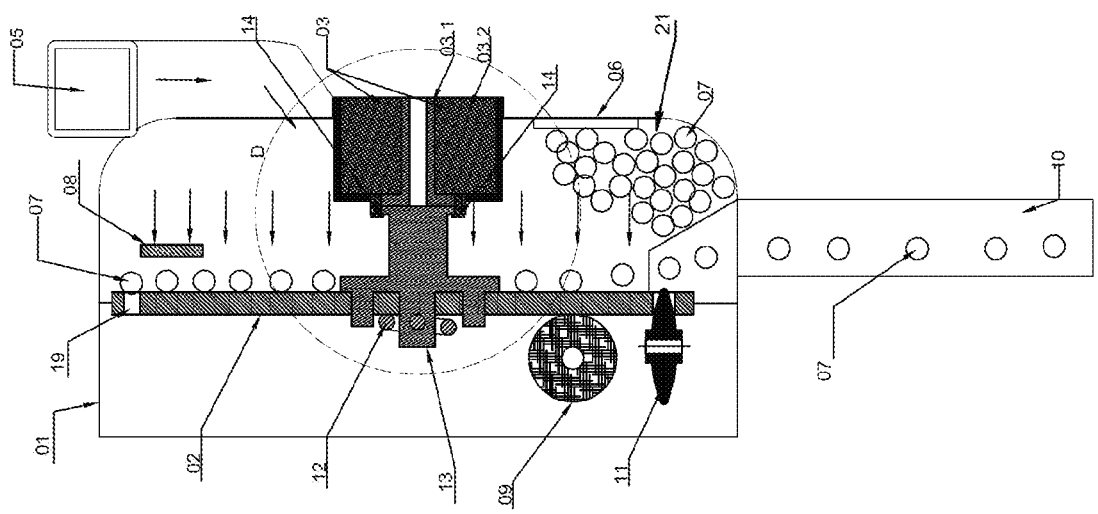

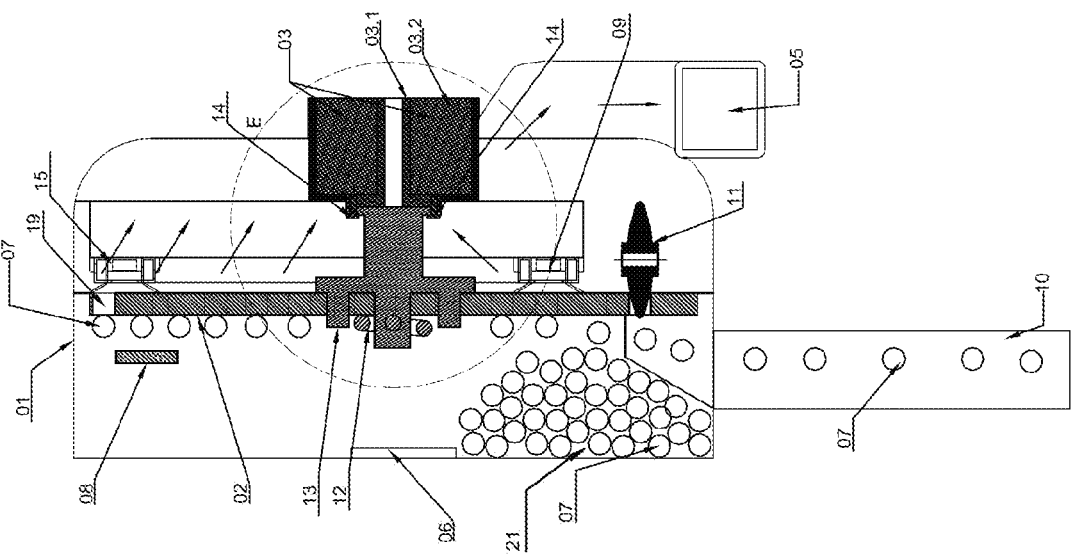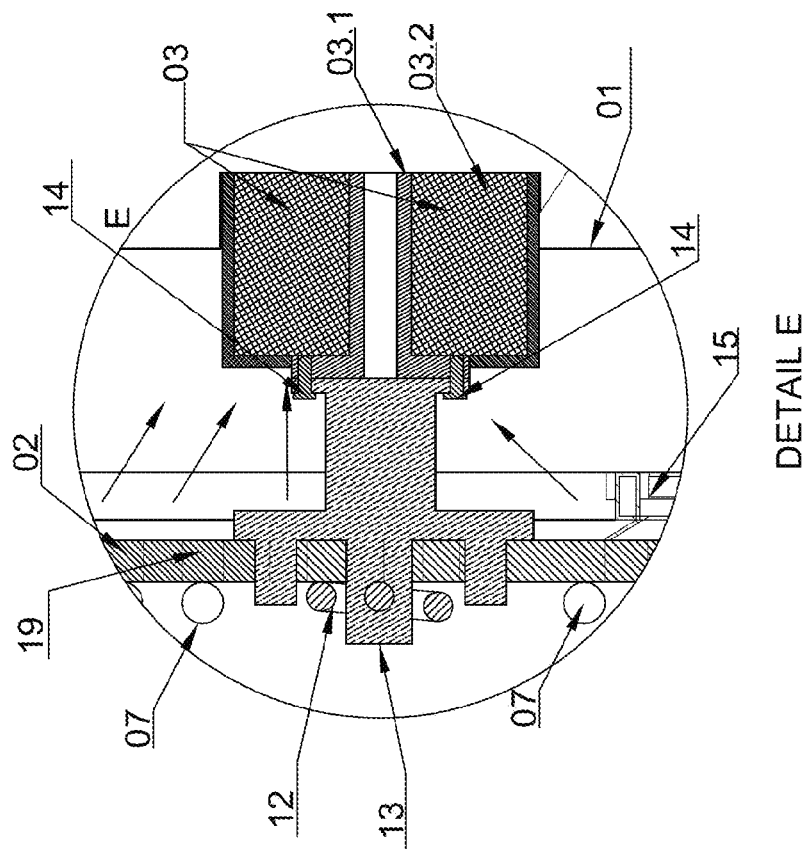

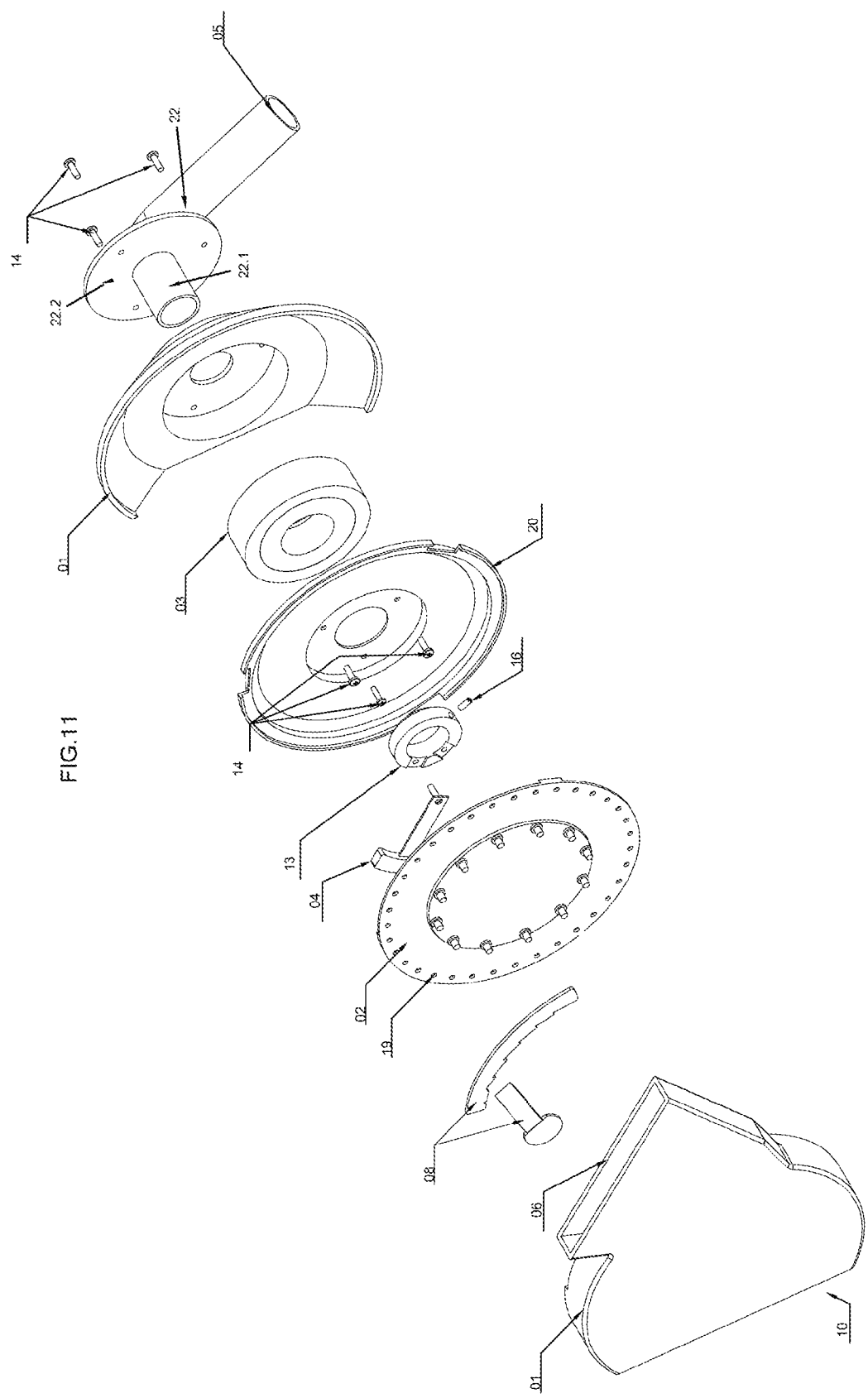

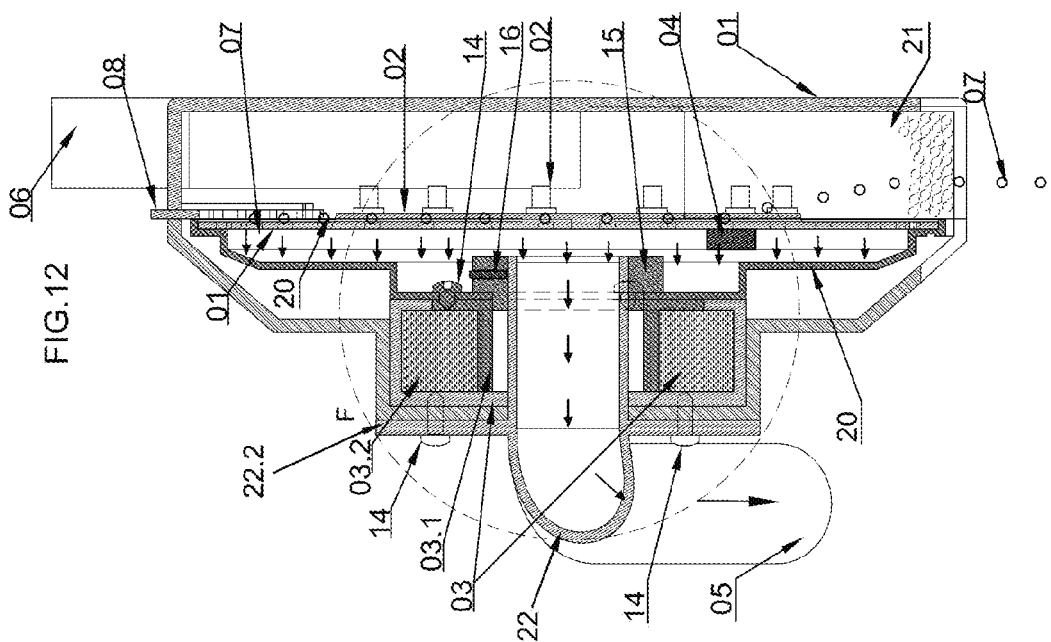
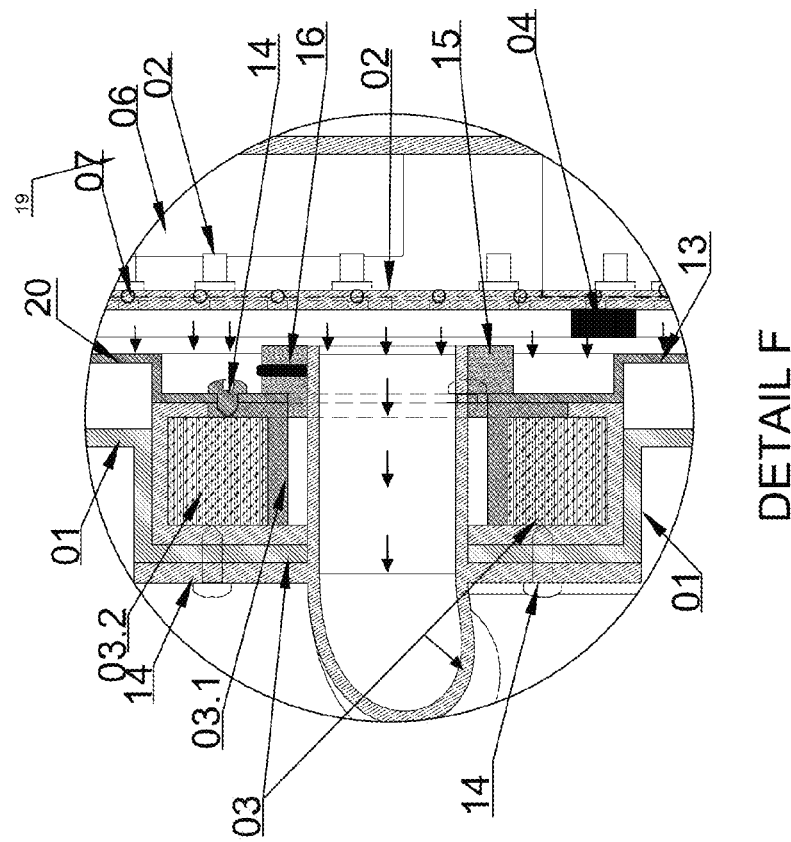
FIG.12
DETAIL F

DIRECT DRIVE SEED METERING DEVICE

CROSS REFERENCE TO RELATED APPLICATIONS

This application is a Divisional of co-pending application Ser. No. 14/611,659, filed on 2 Feb. 2015, for which priority is claimed under 35 U.S.C. §120; and this application claims priority of U.S. Provisional Application No. 62/001,867 filed on 22 May 2014 under 35 U.S.C. §119(e), the entire contents of all of which are hereby incorporated by reference.

FIELD OF THE INVENTION

The present invention refers to a direct drive seed metering device and more specifically to a seed metering device for sowing machines, driven by an coaxial electric motor, comprising a seed metering disc for capturing seeds from a reservoir and laying them in a controlled manner in a furrow in the soil, where in the coaxial electrical motor couples directly to the metering disc without the need for intermediate transmission elements, redactors, gears or timing belts, thus increasing the efficiency of the device.

In preferred embodiments of the present invention, the means for capturing and releasing the seeds operate by vacuum or high pressure.

Additionally, preferred embodiments of the present invention comprise a toroidal electric motor with a hollow rotor shaft, through which the seed capturing means is fluidly connected to vacuum or pressure generating means

BACKGROUND OF THE INVENTION

Row crop sowing machines or seed planters for single seed sowing have been widely used for decades. Usually, said machines comprise at least one rotating disc for holding and supplying the seeds to be planted and means for releasing and conducting the seeds to the furrows on the ground at determined depths and spacing.

The rotating discs usually comprise holes, pockets, cradles or teeth for retaining the seeds with the help of vacuum or positive air pressure that is interrupted at a desired point in order to let the seeds drop into conducting means to the ground.

Most known sowing machines comprising a plurality of metering discs rely on only one driving assembly for simultaneously rotating all discs. In case of machines comprising a large number of metering discs, e.g. 20 or more, said driving assembly is bulky, complicated and expensive, not allowing the individual adjustment of the rotation of each metering disc, necessary in occasions when the sowing machine is not supposed to follow a rectilinear path, wherein the more external sowing devices run for a longer distance than the more internal ones.

Such drawbacks were addressed by the use of hydraulic systems for driving individually each disc, comprising sophisticated electronic control means, requiring both expensive and continuous maintenance.

Some late developments in sowing machines, replaced said hydraulic systems by individual electric motors, leading to much simpler and economic equipment, as particularly disclosed in patent application WO 2012/142607 A1 where the motors are connected to the axles of the metering discs.

Nevertheless, there is still a need for simpler metering devices, with reduced power requirements, and less expensive building and maintenance.

BRIEF DESCRIPTION OF THE INVENTION

The above mentioned drawbacks can be overcome and said needs fulfilled by the use of a seed distributing or metering device driven by a direct drive DC motor of the brushless type, high torque, and annular or toroidal shape comprising a hollow shaft or annular rotor and coaxially coupled to the metering disc.

The application of a high torque motor directly coupled to the rotational working elements of the seed metering device of the invention reduces the need for reductions, gear transmissions, belt transmission and other auxiliary transmission components found in seed metering devices known in the art. This reduction or complete elimination of mechanical transmissions elements between the power source and the load implies a substantial reduction in power loss, which in turn results in improvement in power output, reduced noise and vibrations, and all around greater efficiency.

Additionally, the reduction or elimination of auxiliary transmission elements greatly reduces maintenance costs and complexity, while also improving the device operational life.

Furthermore, the slim design of the high torque, annular motor allows for the motor to be arranged partially or completely within the seed meter housing, reducing the overall size of the device and partially or completely protecting the motor from outside elements.

Therefore, it is an object of the present invention to provide a seed metering device for row crop sowing machines, also called seed planters, comprising:
- a seed metering disc rotatable about a central shaft, having a plurality of seed capturing and retaining means for capturing and retaining the seeds,
- a motor, which drives the seed metering disc,
- releasing means for releasing the seeds from the seed capturing and retaining means,
- conducting means for conducting the released seeds onto the ground, and
- a housing for containing and protecting the metering disc, wherein the motor is of the hollow-shaft type, toroidally shaped and coaxially coupled to the metering disc.

In a preferred embodiment of the present invention, the hollow-shaft motor is a direct drive DC motor of the brushless type.

In a preferred embodiment of the present invention, the seed capturing and retaining means are selected from the group comprising holes, cells or cradles located near the outer perimeter of the metering disc.

In a preferred embodiment of the present invention, the seed capturing and retaining means consist of holes located near the outer perimeter of the metering disc and the hole size is determined by the type of seed to be sown, so as to be able to retain the seeds in place until reaching the releasing means.

In a preferred embodiment of the present invention, the metering disc is a cogwheel or gear, the teeth of which are the seed capturing and retaining means, where the teeth shape and the size of the gap between the teeth being determined by the type of seed to be sown, so as to be able to retain the seeds in place until reaching the releasing means.

In a more preferred embodiment of the present invention, the housing containing the metering disc forms a vacuum chamber together with one of the faces of the metering disc, the device being provided with vacuum generating means for lowering the air pressure on said face of the metering disc so as to capture and retain the seeds within the seed capturing and retaining means arranged on the face of the metering disc opposite the vacuum chamber.

In a more preferred embodiment of the present invention, the housing containing the metering disc forms a high pressure chamber together with one of the faces of the metering disc, the device being provided with blowing means for increasing air pressure on said face of the metering disc so as to capture and retain the seeds within the seed capturing and retaining means arranged on the same face of the metering disc.

In a more preferred embodiment of the present invention, the device further comprises a flexible sealing member contained within the housing, which is sealingly attached to the inner wall of the housing and which is sealingly pressed against one face of the metering disc, thus defining a vacuum chamber, the device being provided with vacuum generating means for lowering the air pressure on said vacuum chamber so as to capture and retain the seeds within the seed capturing and retaining means arranged on the face of the metering disc opposite the vacuum chamber.

In a more preferred embodiment of the present invention, the device further comprises
- a concave plate within the housing, sealingly attached to one face of the seed metering disc, and coupled to the hollow shaft of the motor, thus defining a rotatable vacuum chamber,
- vacuum generating means,
- a non-rotatable tube or conduit, non-rotatably attached to the housing, which passes through the housing and the hollow shaft of the motor into the rotatable vacuum chamber, fluidly connecting the vacuum means to the rotatable vacuum chamber.

In a most preferred embodiment of the present invention, the motor is coupled to the seed metering disc by means of a hollow hub or other suitable coupling means comprising a hollow shaft or tube, and wherein the hollow hub is perforated, fluidly connecting the high pressure chamber or the vacuum chamber, where appropriate, to the hollow motor shaft of the motor coupled to said hollow hub.

In a most preferred embodiment of the present invention, the vacuum generating means or the blowing means are fluidly connected to the vacuum chamber or the high pressure chamber, where appropriate, through the hollow motor shaft of the motor and through the perforated hollow hub.

In a preferred embodiment of the present invention, the vacuum generating means or the blowing means are fluidly connected to said vacuum chamber or high pressure chamber, where appropriate, through an opening or orifice in the housing in a position other than the hollow shaft—eccentrically regarding the metering disc—and wherein the coupling means coupling the motor to the seed metering disk does not allow fluid connection between the vacuum chamber or high pressure chamber, where appropriate, and the hollow shaft of the motor.

In a preferred embodiment of the present invention, the releasing means comprises a plate, fixed to the non-rotatable tube or conduit and located within the rotatable vacuum chamber, which makes contact with a region of the face of the metering disc inside the rotatable vacuum chamber, blocking the orifices of the seed capturing and retaining means and therefore interrupting the vacuum applied to the seeds retained on the other face of the metering disk, making them drop into the conducting means towards the ground.

In a more preferred embodiment of the present invention, the vacuum chamber does not simultaneously overlap with all the seed capturing and retaining means of the metering disc and wherein the release of the seeds from the holes of the seed capturing and retaining means occurs when a particular hole of the seed retaining means no longer overlaps with the vacuum chamber.

In a preferred embodiment of the present invention, the seed releasing means comprises a rotatable wheel contacting the metering disc on the face opposite the seeds capturing and retaining means, the wheel blocking the holes of the seed capturing and retaining means and therefore interrupting the vacuum or pressure applied to the retained seeds, making them drop into the conducting means towards the ground.

In a most preferred embodiment of the present invention, the motor is housed within the housing, fixed to the inner surface of the housing wall.

In a preferred embodiment of the present invention, the motor is fixed to the outer surface of the housing wall.

In a preferred embodiment of the present invention, the seed releasing means comprise stationary or mobile brushes that physically remove the seeds from the seed capturing and retaining means.

In a preferred embodiment of the present invention, the device further comprises singulating means for allowing only one seed to be retained in each capturing and retaining means.

In a preferred embodiment of the present invention, the singulating means comprise a plate, parallel to the metering disc and spaced apart so as to allow only one seed to be retained in each capturing and retaining means.

In a preferred embodiment of the present invention, the conducting means for conducting the released seeds onto the ground comprises a conveyor belt provided with bristles for guiding the seeds to an outlet close to the soil and into an opened furrow in the soil.

In a preferred embodiment of the present invention, the conducting means for conducting the released seeds onto the ground comprises a tube for allowing the seeds to freely reach the soil by gravity, into an opened furrow in the soil.

In a preferred embodiment of the present invention, the seed capturing and retaining means of the seed metering disc comprises holes and the housing comprises a rotatable toothed wheel with a plurality of teeth or projections, that engage with said holes of the seed capturing and retaining means as the disc rotates, removing obstructions and releasing seeds stuck in said holes.

In a most preferred embodiment of the present invention, the motor is a large diameter annular torque motor with an annular rotor.

BRIEF DESCRIPTION OF THE DRAWINGS

FIG. 2 is a schematic cross-section side view of the vacuum seed metering device of FIG. 1;

FIG. 4 is a schematic cross-section side view of the pressure seed metering device of FIG. 3;

FIG. 5 is an exploded perspective view of a vacuum seed metering device wherein the vacuum generating means are connected to the housing through an air extraction conduit, according to a third embodiment of the present invention;

FIG. 6 is a schematic cross-section side view of the vacuum seed metering device of FIG. 5;

FIG. 8 is a schematic cross-section side view of the vacuum seed metering device of FIG. 7;

FIG. 10 is a schematic cross-section side view of the vacuum seed metering device of FIG. 9;

FIG. 11 is an exploded perspective view of a vacuum seed metering device comprising a rotating vacuum chamber, according to a sixth embodiment of the present invention;

FIG. 12 is a schematic cross-section side view of the vacuum seed metering device of FIG. 11;

DEFINITIONS

To the effects of the present invention, the terms "fluid connection", "fluidly connected", "fluidly coupled" and variations of the same are meant to be understood as connection or couplings that allow or maintain the flow of fluids, and more particularly air, between the connected elements.

For all of the embodiments described in the present invention, and any other embodiment within the scope of the present invention, the term "atmospheric pressure chamber" is meant to the be understood as making reference to a chamber that is neither the high pressure chamber nor the vacuum chamber. In some embodiments of the present invention, the "atmospheric pressure chamber" may be fluidly connected to the exterior of the device through suitable fluid connection means, such as holes or conduits. Regardless of the above, the "atmospheric pressure chamber" may not be actually be at atmospheric pressure, but instead is used to identify said chamber from the vacuum chamber or high-pressure chamber respectively. More specifically, it refers to the chamber that is at a higher pressure than the vacuum chamber in vacuum seed metering devices, or the chamber that is at lower pressure than the high pressure chamber in high pressure seed metering devices.

Likewise, the term "vacuum" is meant to be understood as a pressure that is lower than the pressure in the atmospheric pressure chamber, and the term "high pressure" is meant to be understood as a pressure that is higher than the pressure in the The terms "toroidal motor", "annular rotor" and "torque motor" refer to electrical motors whose rotor comprises a passing hole or orifice about its central axis.

DETAILED DESCRIPTION OF THE INVENTION

The invention will be described in more detail below, with reference to the accompanying drawings that illustrate different exemplary embodiments of the present invention.

For all of the following embodiments, while the hollow shaft electric motor of embodiments 1 to 7 and the large diameter torque motor of claims 8 to 9 can be of any type of suitable electric motor with a hollow motor shaft, preferred embodiments of the present invention utilize brushless DC electric motors.

Embodiment 1

Figure 1:
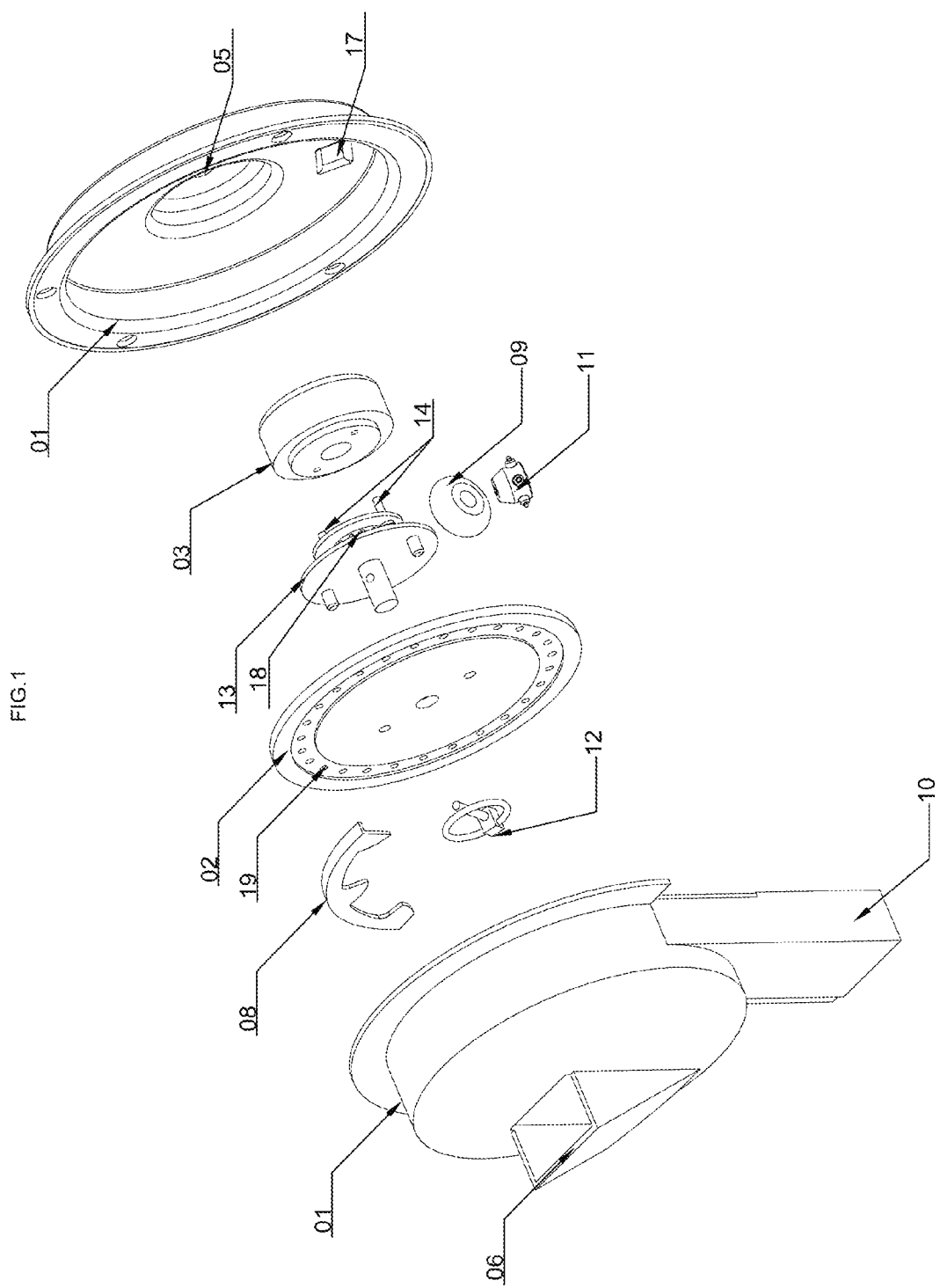
FIG. 1 is an exploded perspective view of a vacuum seed metering device wherein the vacuum generating means are connected to the housing through the hollow motor shaft, according to a first embodiment of the present invention.

FIGS. 1 and 2 show a vacuum seed metering device according to a first embodiment of the present invention. Said vacuum seed metering device comprises a cylindrical housing 01, which houses a rotating metering disc 02 coupled about its central axis to a hollow rotor shaft 03.1 of a coaxially arranged motor 03 by means of a hollow hub 13 or other suitable coupling means which allow the passage of air through it. The stator 03.2 of the motor 03 is fixed to the interior of the housing 01 by suitable fastening means (not shown). The hollow hub 13 is coupled to the hollow motor shaft 03.1 by rods or pins 14 or other suitable fastening means. The metering disc 02 is coupled to the hollow hub 13 by a cotter pin 12 or other suitable securing means.

The metering disc 02 divides the housing 01 into two chambers; a vacuum chamber, fluidly connected to a vacuum generation means (not shown), and an atmospheric pressure chamber. Seeds 07 are loaded into a reservoir 21 within the atmospheric pressure chamber through a seed inlet 06, which may or may not comprise a hopper and/or closure means (not shown). Vacuum is created in the vacuum chamber by the extraction of air in said chamber by means of a vacuum generating means (not shown) through an air extraction outlet 05. Fluid connection between the vacuum generating means and the vacuum chamber in the housing 01 is achieved through a plurality of orifices or holes 18 in the hollow hub 13 which connects the hollow motor shaft 03.1 of the motor 03 to the metering disc 02. In turn, the hollow motor shaft 03.1 is fluidly connected to the air extraction outlet 05, which is connected to the vacuum generating means (not shown).

The metering disc 02 comprises a plurality of radially spaced holes 19 or other suitable seed retaining means on its outer region. The holes 19 utilize the vacuum generated in the vacuum chamber by the vacuum generating means to capture seeds 07 from the seed reservoir 21 and retain them until the vacuum is interrupted by a wheel 09 or other suitable seed releasing means, releasing the seed 07 from the holes 19 of the metering disc 02, preferably into a seed outlet 10.

In a preferred embodiment the wheel 09 comprises a device arranged to block or isolate the affected holes 19 from the vacuum generated by the vacuum generating means, causing the seed to be released from said affected hole 19.

Preferably, the wheel 09 is made from a flexible material, like rubber or other polymeric material, and located on the side of the metering disc 02 opposite to the seeds 07, which can isolate a particular hole 19 from the vacuum source.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity 17 within the housing 01, which doubles both as a cleaning device for cleaning and removing obstructions in the holes 19 and as an auxiliary means for releasing seeds 07 not properly released by the seed releasing wheel 09. Preferably, the toothed wheel 11 is made from flexible material, like rubber or other polymeric material.

In operation, seeds 07 captured by the metering disc 02, and not removed by the curved plate 08, are carried over to the wheel 09, which in turn releases the seeds 07 from the metering disc 02 and allows them to freely fall through a seed outlet 10, through a conducting means to an opened furrow on the soil or another section of the seeding equipment.

Embodiment 2

Figure 3:
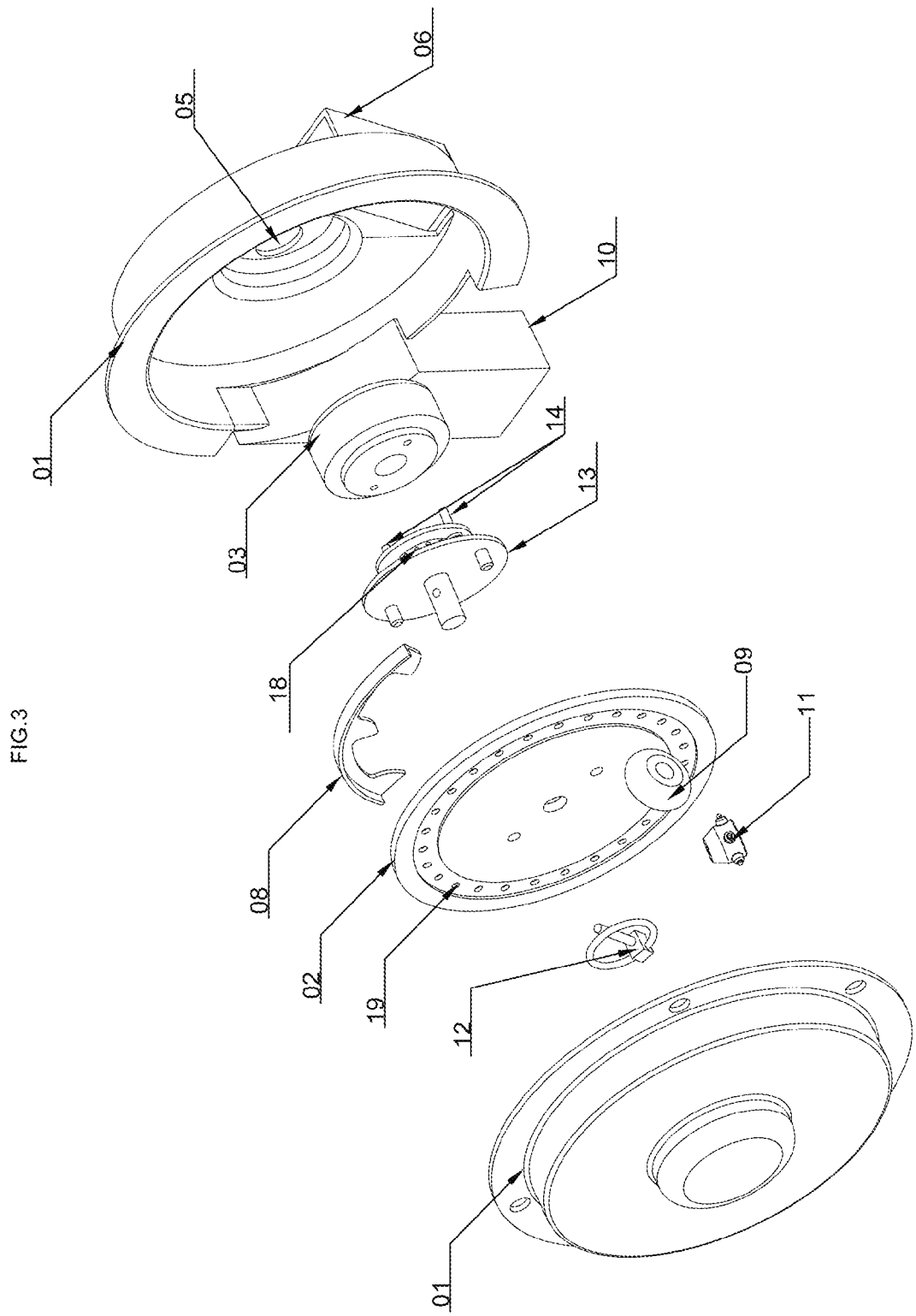
FIG. 3 is an exploded perspective view of a pressure seed metering device wherein the blowing means are connected to the housing through the hollow motor shaft, according to a second embodiment of the present invention.

FIGS. 3 and 4 show a pressure seed metering device according to a second embodiment of the present invention. Said pressure seed metering device comprises a cylindrical housing 01, which houses a rotating metering disc 02 coupled about its central axis to a hollow rotor shaft 03.1 of a coaxially arranged motor 03 by means of a hollow hub 13 or other suitable coupling means which allow the passage of air through it. The stator 03.2 of the motor 03 is fixed to the interior of the housing 01 by suitable fastening means (not shown). The hollow hub 13 is coupled to the hollow motor shaft 03.1 by rods or pins 14 or other suitable fastening means. The metering disc 02 is coupled to the hollow hub 13 by a cotter pin 12 or other suitable securing means.

The metering disc 02 divides the housing 01 into two chambers; a positive pressure chamber, fluidly connected to a blowing means (not shown), and an atmospheric pressure chamber. Seeds 07 are loaded into a reservoir 21 within the positive pressure chamber through a seed inlet 06, which may or may not comprise a hopper and comprises sealing means (not shown). Pressure is created in the positive pressure chamber by the pressurization of air in said chamber by means of a blowing means (not shown), such as an air compressor, through a pressurized air inlet 05. Fluid connection between the blowing means and the positive pressure chamber in the housing 01 is achieved through a plurality of orifices or holes 18 in the hollow hub 13 which connects the hollow motor shaft 03.1 of the motor 03 to the metering disc 02. In turn, the hollow motor shaft 03.1 is fluidly connected to the pressurized air inlet 05, which is connected to the blowing means (not shown).

The metering disc 02 comprises a plurality of radially spaced holes 19 or other suitable seed retaining means on its outer region. The holes 19 utilize the pressure generated in the positive pressure chamber by the blowing means to capture seeds 07 from the seed reservoir 21 and retain them until the pressure is interrupted by a wheel 09 or other suitable seed releasing means, releasing the seed 07 from the holes 19 of the metering disc 02, preferably into a seed outlet 10.

In a preferred embodiment the wheel 09 comprises a device arranged to block or isolate the affected holes 19 from the pressure generated by the blowing means, causing the seed to be released from said affected hole 19. Preferably, the wheel 09 is made from a flexible material, like rubber or other polymeric material, and located on the side of the metering disc 02 opposite to the seeds 07, which can isolate a particular hole 19 from the pressure source.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity (not shown) within the housing 01, which doubles both as a cleaning device for cleaning and removing obstructions in the holes 19 and as an auxiliary means for releasing seeds 07 not properly released by the seed releasing wheel 09. Preferably, the toothed wheel 11 is made from flexible material, like rubber or other polymeric material.

In operation, seeds 07 captured by the metering disc 02, and not removed by the curved plate 08, are carried over to the wheel 09, which in turn releases the seeds 07 from the metering disc 02 and allows them to freely fall through a seed outlet 10, through a conducting means to an opened furrow on the soil or another section of the seeding equipment.

Embodiment 3

FIGS. 5 and 6 show a vacuum seed metering device according to a third embodiment of the present invention. Said vacuum seed metering device comprises a cylindrical housing 01, which houses a rotating metering disc 02 coupled about its central axis to a hollow rotor shaft 03.1 of a coaxially arranged motor 03 by means of a hub 13 or other suitable coupling means. The stator 03.2 of the motor 03 is fixed to the interior of the housing 01 by suitable fastening means (not shown). The hub 13 is coupled to the hollow motor shaft 03.1 by rods or pins 14 or other suitable fastening means. The metering disc 02 is coupled to the hub 13 by a cotter pin 12 or other suitable securing means.

The metering disc 02 divides the housing 01 into two chambers; a vacuum chamber, fluidly connected to a vacuum generation means (not shown), and an atmospheric pressure chamber. Seeds 07 are loaded into a reservoir 21 within the atmospheric pressure chamber through a seed inlet 06, which may or may not comprise a hopper and/or closure means (not shown). Vacuum is created in the vacuum chamber by the extraction of air in said chamber by means of a vacuum generating means (not shown) coupled to an air extraction outlet 05 formed on or attached to the housing 01, fluidly connecting the vacuum generating means to said vacuum chamber. The hub 13 further provides a fluid seal over the hollow motor shaft 03.1 of the motor 03, preventing fluid circulation of air through the hollow shaft 03.1 from and to the housing 01.

The metering disc 02 comprises a plurality of radially spaced holes 19 or other suitable seed retaining means on its outer region. The holes 19 utilize the vacuum generated in the vacuum chamber by the vacuum generating means to capture seeds 07 from the seed reservoir 21 and retain them until the vacuum is interrupted by a wheel 09 or other suitable seed releasing means, releasing the seed 07 from the holes 19 of the metering disc 02, preferably into a seed outlet 10.

In a preferred embodiment the wheel 09 comprises a device arranged to block or isolate the affected holes 19 from the vacuum generated by the vacuum generating means, causing the seed to be released from said affected hole 19.

Preferably, the wheel 09 is made from a flexible material, like rubber or other polymeric material, and located on the side of the metering disc 02 opposite to the seeds 07, which can isolate a particular hole 19 from the vacuum source.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity 17 within the housing 01, which doubles both as a cleaning device for cleaning and removing obstructions in the holes 19 and as an auxiliary means for releasing seeds 07 not properly released by the seed releasing wheel 09. Preferably, the toothed wheel 11 is made from flexible material, like rubber or other polymeric material.

In operation, seeds 07 captured by the metering disc 02, and not removed by the curved plate 08, are carried over to the wheel 09, which in turn releases the seeds 07 from the metering disc 02 and allows them to freely fall through a seed outlet 10, through a conducting means to an opened furrow on the soil or another section of the seeding equipment.

Embodiment 4

Figure 7:
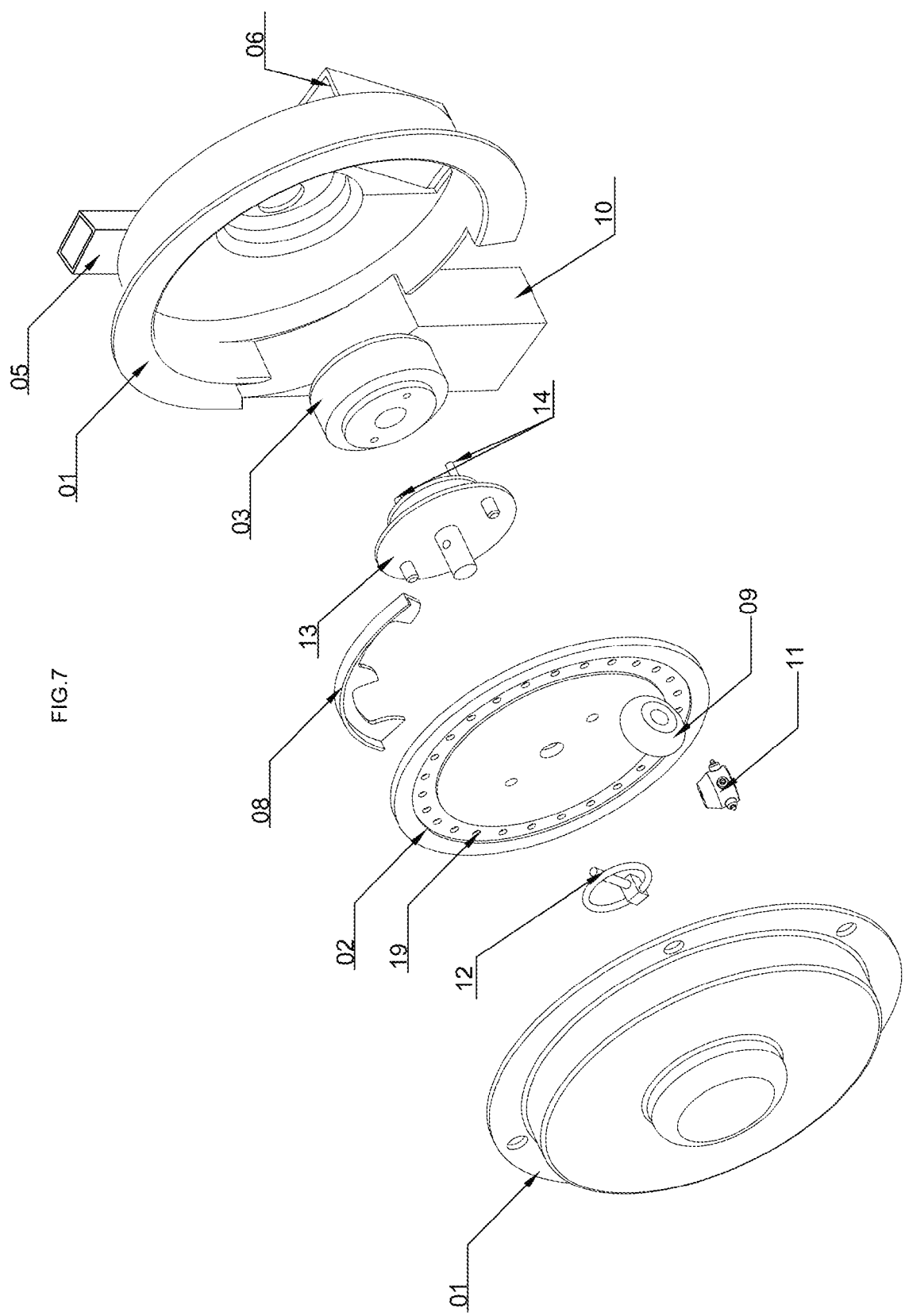
FIG. 7 is an exploded perspective view of a pressure seed metering device wherein the blowing means are connected to the housing through an air intake conduit, according to a fourth embodiment of the present invention.

FIGS. 7 and 8 show a pressure seed metering device according to a fourth embodiment of the present invention. Said pressure seed metering device comprises a cylindrical housing 01, which houses a rotating metering disc 02 coupled about its central axis to a hollow rotor shaft 03.1 of a coaxially arranged motor 03 by means of a hub 13 or other suitable coupling means. The stator 03.2 of the motor 03 is fixed to the interior of the housing 01 by suitable fastening means (not shown). The hub 13 is coupled to the hollow motor shaft 03.1 by rods or pins 14 or other suitable fastening means. The metering disc 02 is coupled to the hub 13 by a cotter pin 12 or other suitable securing means.

The metering disc 02 divides the housing 01 into two chambers; a positive pressure chamber, fluidly connected to a blowing means (not shown), and an atmospheric pressure chamber. Seeds 07 are loaded into a reservoir 21 within the positive pressure chamber through a seed inlet 06, which may or may not comprise a hopper and comprises sealing means (not shown). Pressure is created in the positive pressure chamber by the pressurization of air in said chamber by means of a blowing means (not shown), such as an air compressor, through a pressurized air inlet 05 formed on or attached to the housing 01, fluidly connecting the blowing means to said positive pressure chamber. The hub 13 further provides a fluid seal over the hollow motor shaft 03.1 of the motor 03, preventing fluid circulation of air through the hollow shaft 03.1 from and to the housing 01.

The metering disc 02 comprises a plurality of radially spaced holes 19 or other suitable seed retaining means on its outer region. The holes 19 utilize the pressure generated in the positive pressure chamber by the blowing means to capture seeds 07 from the seed reservoir 21 and retain them until the pressure is interrupted by a wheel 09 or other suitable seed releasing means, releasing the seed 07 from the holes 19 of the metering disc 02, preferably into a seed outlet 10.

In a preferred embodiment the wheel 09 comprises a device arranged to block or isolate the affected holes 19 from the pressure generated by the blowing means, causing the seed to be released from said affected hole 19. Preferably, the wheel 09 is made from a flexible material, like rubber or other polymeric material, and located on the side of the metering disc 02 opposite to the seeds 07, which can isolate a particular hole 19 from the pressure source.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity (not shown) within the housing 01, which doubles both as a cleaning device for cleaning and removing obstructions in the holes 19 and as an auxiliary means for releasing seeds 07 not properly released by the seed releasing wheel 09. Preferably, the toothed wheel 11 is made from flexible material, like rubber or other polymeric material.

In operation, seeds 07 captured by the metering disc 02, and not removed by the curved plate 08, are carried over to the wheel 09, which in turn releases the seeds 07 from the metering disc 02 and allows them to freely fall through a seed outlet 10, through a conducting means to an opened furrow on the soil or another section of the seeding equipment.

Embodiment 5

Figure 9:
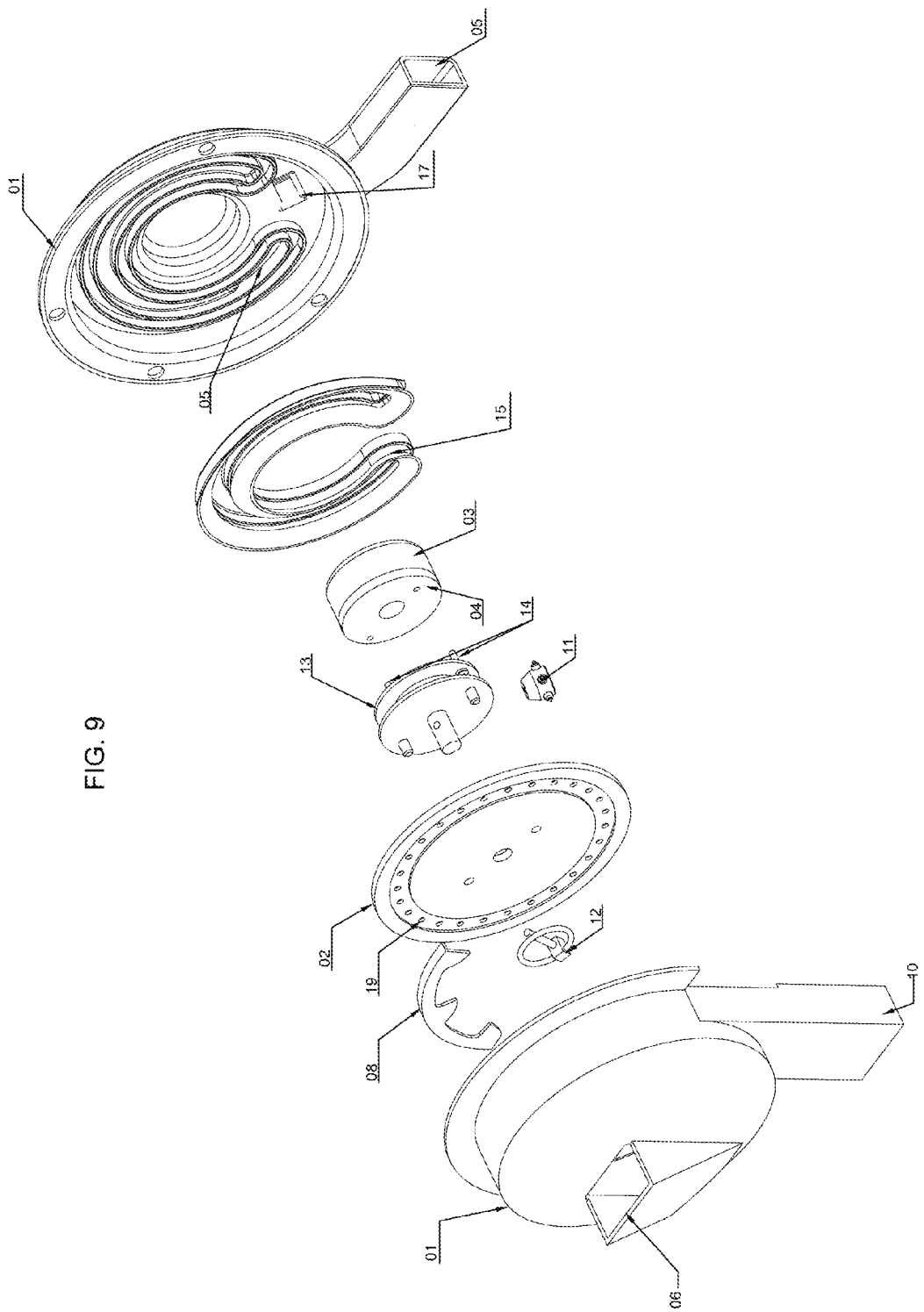
FIG. 9 is an exploded perspective view of a vacuum seed metering device comprising a vacuum chamber, according to a fifth embodiment of the present invention.

FIGS. 9 and 10 show a vacuum seed metering device according to a fifth embodiment of the present invention. Said vacuum seed metering device comprises a cylindrical housing 01, which houses a rotating metering disc 02 coupled about its central axis to a hollow rotor shaft 03.1 of a coaxially arranged motor 03 by means of a hub 13 or other suitable coupling means. The stator 03.2 of the motor 03 is fixed to the interior of the housing 01 by suitable fastening means (not shown). The hub 13 is coupled to the hollow motor shaft 03.1 by rods or pins 14 or other suitable fastening means. The metering disc 02 is coupled to the hub 13 by a cotter pin 12 or other suitable securing means.

A sealing member 15 is sealingly attached to the interior wall of the housing 01 and is sealingly pressed against a face of the metering disc 02, thus defining a vacuum chamber, while the remaining volume of the housing 01 defines an atmospheric pressure chamber. The sealing member 15 is made from a flexible material, like rubber or other polymeric material. The vacuum chamber is fluidly connected to a vacuum generation means (not shown), through an air extraction outlet 05 formed on or attached to the housing 01. The hub 13 further provides a fluid seal over the hollow motor shaft 03.1 of the motor 03, preventing fluid circulation of air through the hollow shaft 03.1 from and to the housing 01.

Seeds 07 are loaded into a reservoir 21 within the atmospheric pressure chamber through a seed inlet 06, which may or may not comprise a hopper and/or closure means (not shown).

The metering disc 02 comprises a plurality of radially spaced holes 19 or other suitable seed retaining means on its outer region. The sealing member 15 is arranged over the face of the metering disc 02 so as to overlap the vacuum chamber over some, but not all, the radially spaced holes 19.

The holes 19 utilize the vacuum in the overlapping vacuum chamber generated by the vacuum generating means to capture seeds 07 from the seed reservoir 21 and retain them until the vacuum is interrupted, releasing the seed 07 from the holes 19 of the metering disc 02, preferably into a seed outlet 10. Interruption of the vacuum affecting a specific hole 19 is achieved by rotating the metering disc 02 until said specific hole no longer overlaps with the vacuum chamber, thus releasing the captured seed.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity 17 within the housing 01, which doubles both as a cleaning device for cleaning and removing obstructions in the holes 19 and as an auxiliary means for releasing seeds 07 not properly released by the seed releasing mechanism. Preferably, the toothed wheel 11 is made from flexible material, like rubber or other polymeric material.

In operation, seeds 07 captured by the seed holes 19 in the metering disc 02, and not removed by the curved plate 08, are carried over by the rotating metering disc 02 until their respective seed holes 19 no longer overlaps with the vacuum chamber, thus releasing the seeds 07 from the metering disc 02 and allowing them to freely fall through a seed outlet 10, through a conducting means to an opened furrow on the soil or another section of the seeding equipment.

Embodiment 6

FIGS. 11 and 12 show a vacuum seed metering device according to a sixth embodiment of the present invention. Said vacuum seed metering device comprises a cylindrical housing 01, which houses a rotating metering disc 02 sealingly attached to an concave plate 20 coupled about its central axis to a hollow rotor shaft 03.1 of a coaxially arranged motor 03 by screws, bolts or other suitable fastening means 14. The stator 03.2 of the motor 03 is fixed to the interior of the housing 01 by suitable fastening means (not shown).

The metering disc 02 and the concave plate 20 define a rotating vacuum chamber, fluidly connected to a vacuum generation means (not shown) through a vacuum conduit 22. The remaining volume of the housing 01 defines an atmospheric pressure chamber. Seeds 07 are loaded into a reservoir 21 within the atmospheric pressure chamber through a seed inlet 06, which may or may not comprise a hopper and/or closure means (not shown).

The vacuum conduit 22, having a protruding hollow member 22.1, a flange 22.2 and an air extraction outlet 05, is sealingly attached by its flange 22.2 to the exterior of the housing 01 by means of screws 14, bolts or any other suitable fastening means. The protruding hollow member 22.1 of the vacuum conduit 22 is inserted coaxially and through the hollow motor shaft 03.1 of the motor 03 and into vacuum chamber defined by the metering disc 02 and the concave plate 20, providing fluid connection between said vacuum chamber and the vacuum generating means (not shown) through the air extraction outlet 05. It should be noted that the protruding hollow member 22.1 of the vacuum conduit 22 is not joined or attached to the hollow motor shaft 03.1 of the motor 03 and thus does not rotate.

The metering disc 02 comprises a plurality of radially spaced holes 19 or other suitable seed retaining means on its outer region. The holes 19 utilize the vacuum generated in the vacuum chamber by the vacuum generating means to capture seeds 07 from the seed reservoir 21 and retain them until the vacuum is interrupted by a plate 04 or other suitable seed releasing means, releasing the seed 07 from the holes 19 of the metering disc 02, preferably into a seed outlet 10.

The plate 04 is a plate made from a flexible material, like rubber or other polymeric material, located within the rotating vacuum chamber and non-rotatably attached to the protruding hollow member 22.1 of the vacuum conduit 22 by means of a hub 13. The hub 13 is joined to the protruding hollow member 22.1 of the vacuum conduit 22 by at least one rod or pin 16 or a suitable fastening means.

The embodiment further comprises a suitable curved plate 08 or other singulating means to prevent the simultaneous retention and discharge of two or more seeds 07 from a single hole 19, by removing excess seeds and returning them to the seed reservoir 21.

In operation, seeds 07 captured by the metering disc 02, and not removed by the curved plate 08, are carried over to the plate 04, which in turn releases the seeds 07 from the metering disc 02 and allows them to freely fall through a seed outlet 10, through a conducting means to an opened furrow on the soil or another section of the seeding equipment.

Embodiment 7

Figure 13:
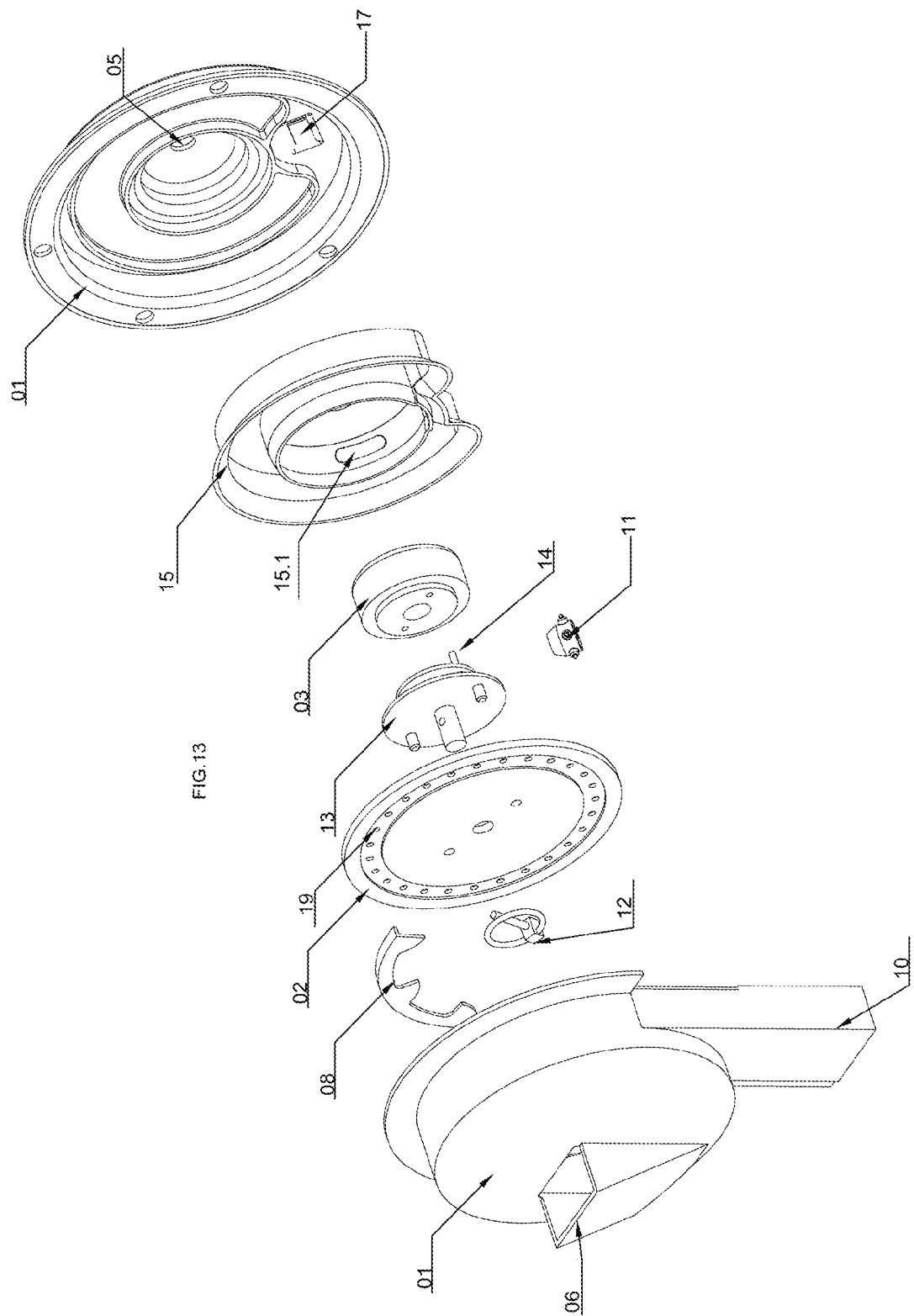
FIG. 13 is an exploded perspective view of a vacuum seed metering device comprising a vacuum chamber connected to the vacuum generating means through the hollow motor shaft, according to a seventh embodiment of the present invention.
Figure 14:
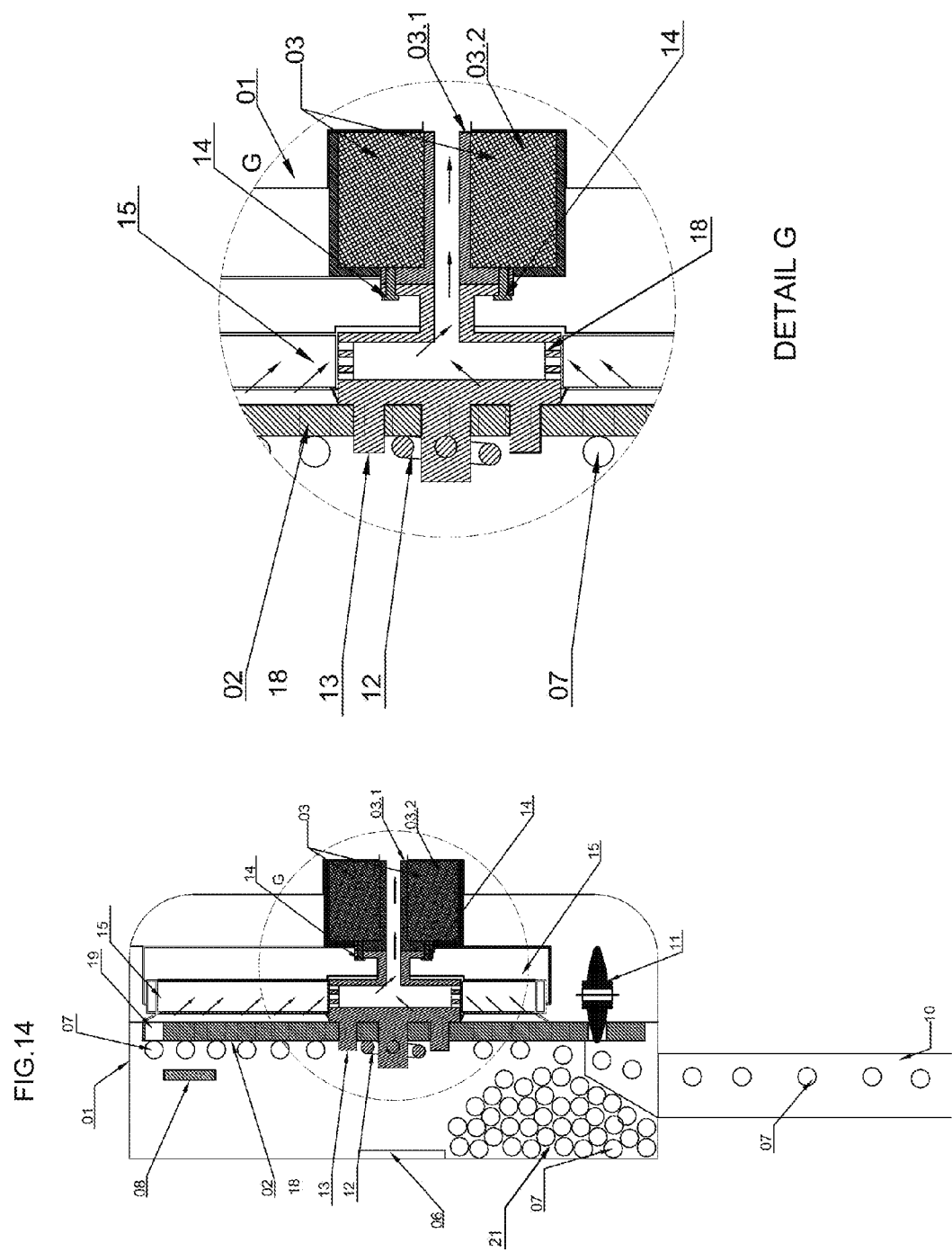
FIG. 14 is a schematic cross-section side view of the vacuum seed metering device of FIG. 13.

FIGS. 13 and 14 show a vacuum seed metering device according to a seventh embodiment of the present invention. Said vacuum seed metering device comprises a cylindrical housing 01, which houses a rotating metering disc 02 coupled about its central axis to a hollow rotor shaft 03.1 of a coaxially arranged motor 03 by means of a hollow hub 13 or other suitable coupling means which allow the passage of air through it. The stator 03.2 of the motor 03 is fixed to the interior of the housing 01 by suitable fastening means (not shown). The hollow hub 13 is coupled to the hollow motor shaft 03.1 by rods or pins 14 or other suitable fastening means. The metering disc 02 is coupled to the hub 13 by a cotter pin 12 or other suitable securing means.

A sealing member 15 is sealingly attached to the interior wall of the housing 01 and is sealingly pressed against a face of the metering disc 02, thus defining a vacuum chamber, while the remaining volume of the housing 01 defines an atmospheric pressure chamber. The sealing member 15 is made from a flexible material, like rubber or other polymeric material and contains an opening or orifice 15.1 formed on its inner wall. The vacuum chamber is fluidly connected to the hollow motor shaft 03.1 of the motor 03 through said opening or orifice 15.1 formed on the inner wall of the sealing member 15 and through a plurality of orifices or holes 18 formed in the hollow hub 13, which connects said hollow motor shaft 03.1 of said motor 03 to the metering disc 02. In turn, said hollow motor shaft 03.1 is fluidly connected to the vacuum generating means (not shown) through an air extraction outlet 05. Thus, fluid connection between the vacuum chamber and the vacuum generating means is achieved (not shown).

Seeds 07 are loaded into a reservoir 21 within the atmospheric pressure chamber through a seed inlet 06, which may or may not comprise a hopper and/or closure means (not shown).

The metering disc 02 comprises a plurality of radially spaced holes 19 or other suitable seed retaining means on its outer region. The sealing member 15 is arranged over the face of the metering disc 02 so as to overlap the vacuum chamber over some, but not all, the radially spaced holes 19.

The holes 19 utilize the vacuum in the overlapping vacuum chamber generated by the vacuum generating means to capture seeds 07 from the seed reservoir 21 and retain them until the vacuum is interrupted, releasing the seed 07 from the holes 19 of the metering disc 02, preferably into a seed outlet 10. Interruption of the vacuum affecting a specific hole 19 is achieved by rotating the metering disc 02 until said specific hole no longer overlaps with the vacuum chamber, thus releasing the captured seed.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity 17 within the housing 01, which doubles both as a cleaning device for cleaning and removing obstructions in the holes 19 and as an auxiliary means for releasing seeds 07 not properly released by the seed releasing mechanism. Preferably, the toothed wheel 11 is made from flexible material, like rubber or other polymeric material.

In operation, seeds 07 captured by the seed holes 19 in the metering disc 02, and not removed by the curved plate 08, are carried over by the rotating metering disc 02 until their respective seed holes 19 no longer overlaps with the vacuum chamber, thus releasing the seeds 07 from the metering disc 02 and allowing them to freely fall through a seed outlet 10, through a conducting means to an opened furrow on the soil or another section of the seeding equipment.

Embodiment 8

Figure 15:
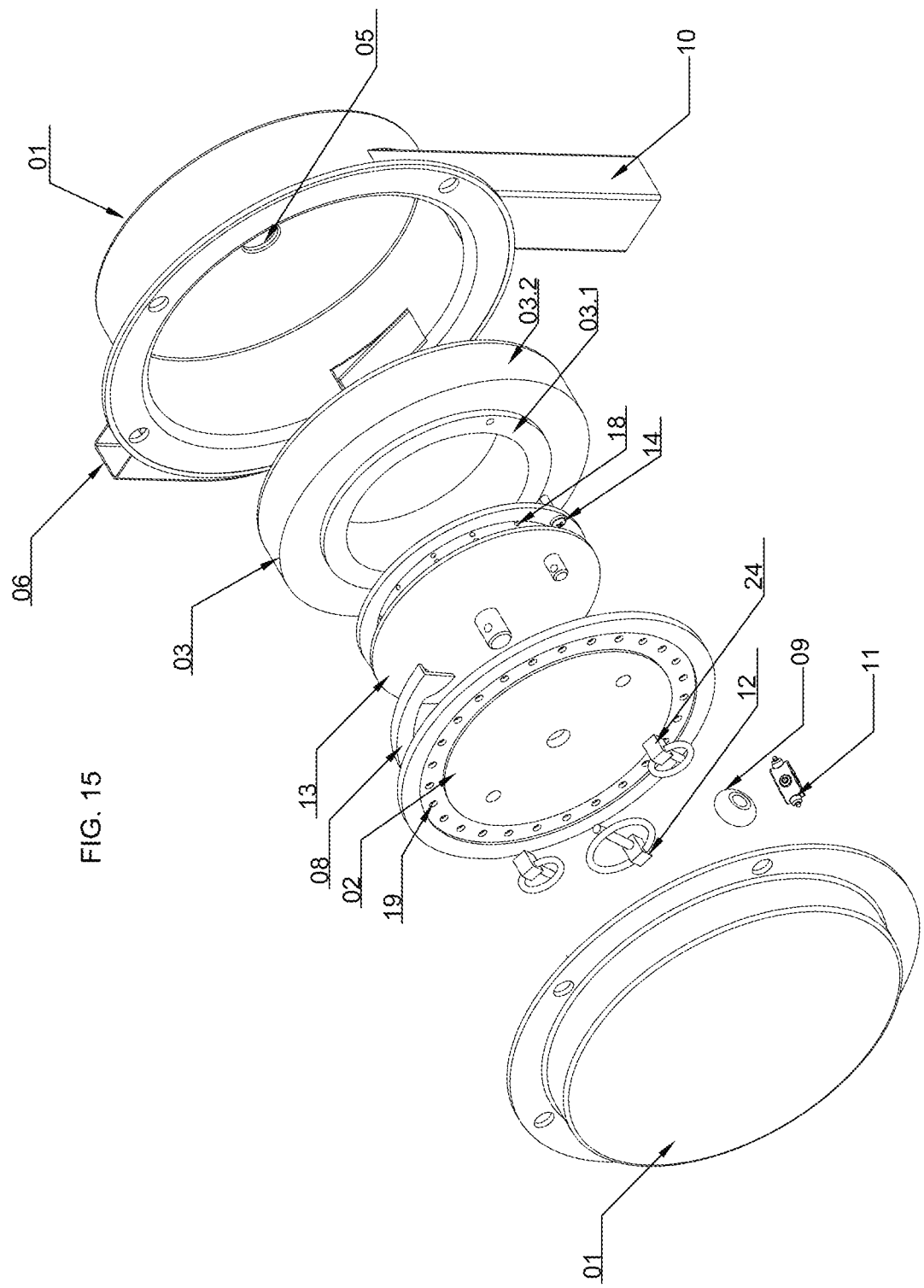
FIG. 15 is an exploded perspective view of a pressure seed metering device comprising a large diameter torque motor with an annular rotor, wherein the pressure generating means are connected to the housing through the annular rotor of the torque motor, according to an eighth embodiment of the present invention.
Figure 16:
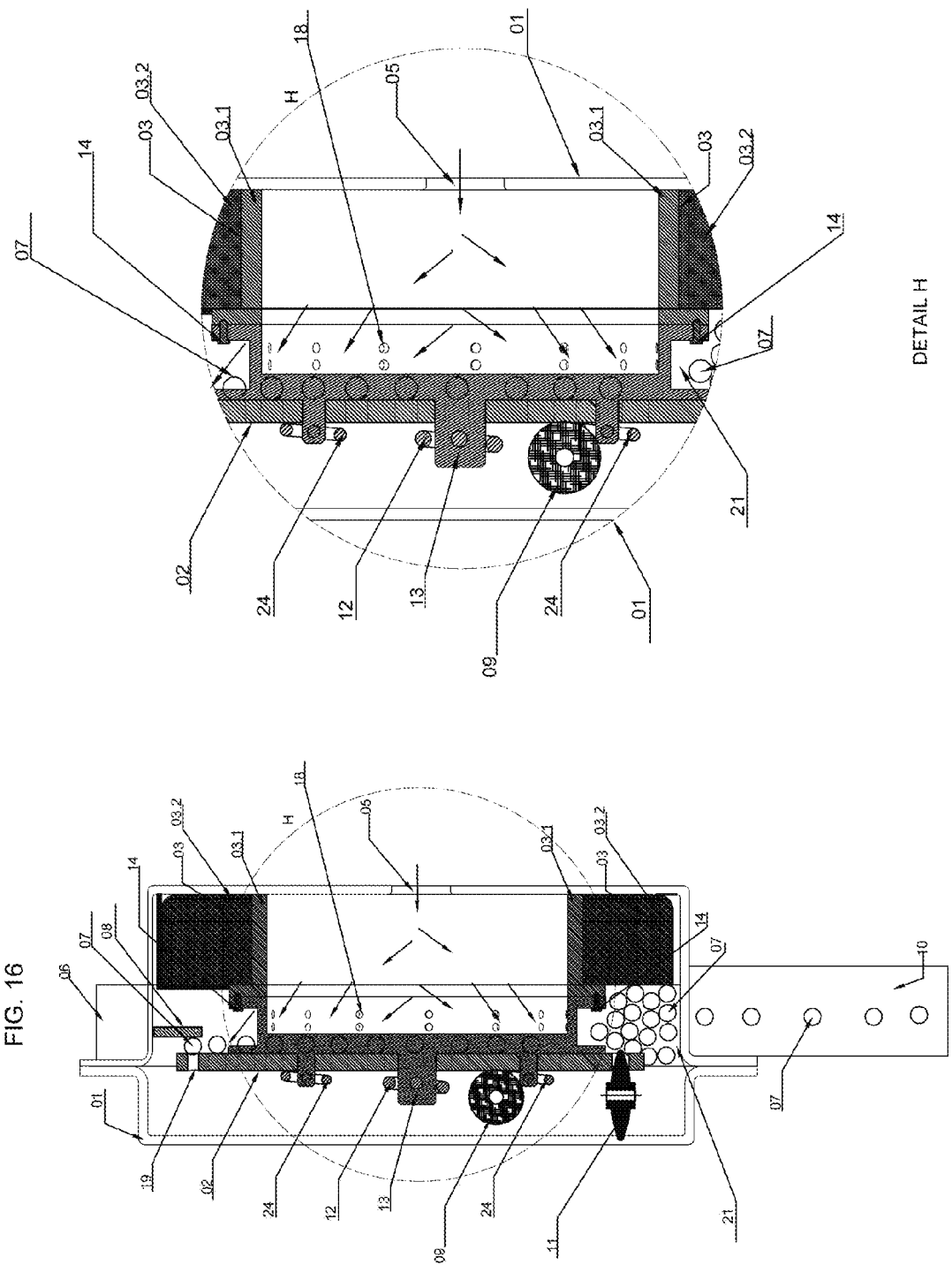
FIG. 16 is a schematic cross-section side view of the pressure seed metering device of FIG. 15.

FIGS. 15 and 16 show a pressure seed metering device according to an eighth embodiment of the present invention. Said pressure seed metering device comprises a cylindrical housing 01, which houses a rotating metering disc 02 coaxially coupled about its central axis to an annular rotor 03.1 of a coaxially arranged large diameter torque motor 03 by means of a hollow hub 13 or other suitable coupling means which allow the passage of air through it. The annular stator 03.2 of the large diameter torque motor 03 is fixed to the interior of the housing 01 by suitable fastening means (not shown). The hollow hub 13 is coupled to the annular rotor 03.1 by rods or pins 14 or other suitable fastening means. The metering disc 02 is coupled to the hollow hub 13 by suitable securing means. In a preferred embodiment, the metering disc 02 is secured to the hollow hub 13 by means of a cotter pin 12 secured about a main central rod of the hollow hub 13 and a plurality of radially displaced lesser pins 24 secured about secondary fastening rods on the hub 13.

The metering disc 02 divides the housing 01 into two chambers; a positive pressure chamber, fluidly connected to a blowing means (not shown), and an atmospheric pressure chamber. Seeds 07 are loaded into a reservoir 21 within the positive pressure chamber through a seed inlet 06, which may or may not comprise a hopper and comprises sealing means (not shown). Pressure is created in the positive pressure chamber by the pressurization of air in said chamber by means of a blowing means (not shown), such as an air compressor, through a pressurized air inlet 05. Fluid connection between the blowing means and the positive pressure chamber in the housing 01 is achieved through a plurality of orifices or holes 18 in the hollow hub 13 which connects the annular rotor 03.1 of the large diameter torque motor 03 to the metering disc 02. In turn, the annular rotor 03.1 is fluidly connected to the pressurized air inlet 05, which is connected to the blowing means (not shown).

The metering disc 02 comprises a plurality of radially spaced holes 19 or other suitable seed retaining means on its outer region. The holes 19 utilize the pressure generated in the positive pressure chamber by the blowing means to capture seeds 07 from the seed reservoir 21 and retain them until the pressure is interrupted by a wheel 09 or other suitable seed releasing means, releasing the seed 07 from the holes 19 of the metering disc 02, preferably into a seed outlet 10.

In a preferred embodiment the wheel 09 comprises a device arranged to block or isolate the affected holes 19 from the pressure generated by the blowing means, causing the seed to be released from said affected hole 19. Preferably, the wheel 09 is made from a flexible material, like rubber or other polymeric material, and located on the side of the metering disc 02 opposite to the seeds 07, which can isolate a particular hole 19 from the pressure source.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity (not shown) within the housing 01, which doubles both as a cleaning device for cleaning and removing obstructions in the holes 19 and as an auxiliary means for releasing seeds 07 not properly released by the seed releasing wheel 09. Preferably, the toothed wheel 11 is made from flexible material, like rubber or other polymeric material.

In operation, seeds 07 captured by the metering disc 02, and not removed by the curved plate 08, are carried over to the wheel 09, which in turn releases the seeds 07 from the metering disc 02 and allows them to freely fall through a seed outlet 10, through a conducting means to an opened furrow on the soil or another section of the seeding equipment.

Embodiment 9

Figure 17:
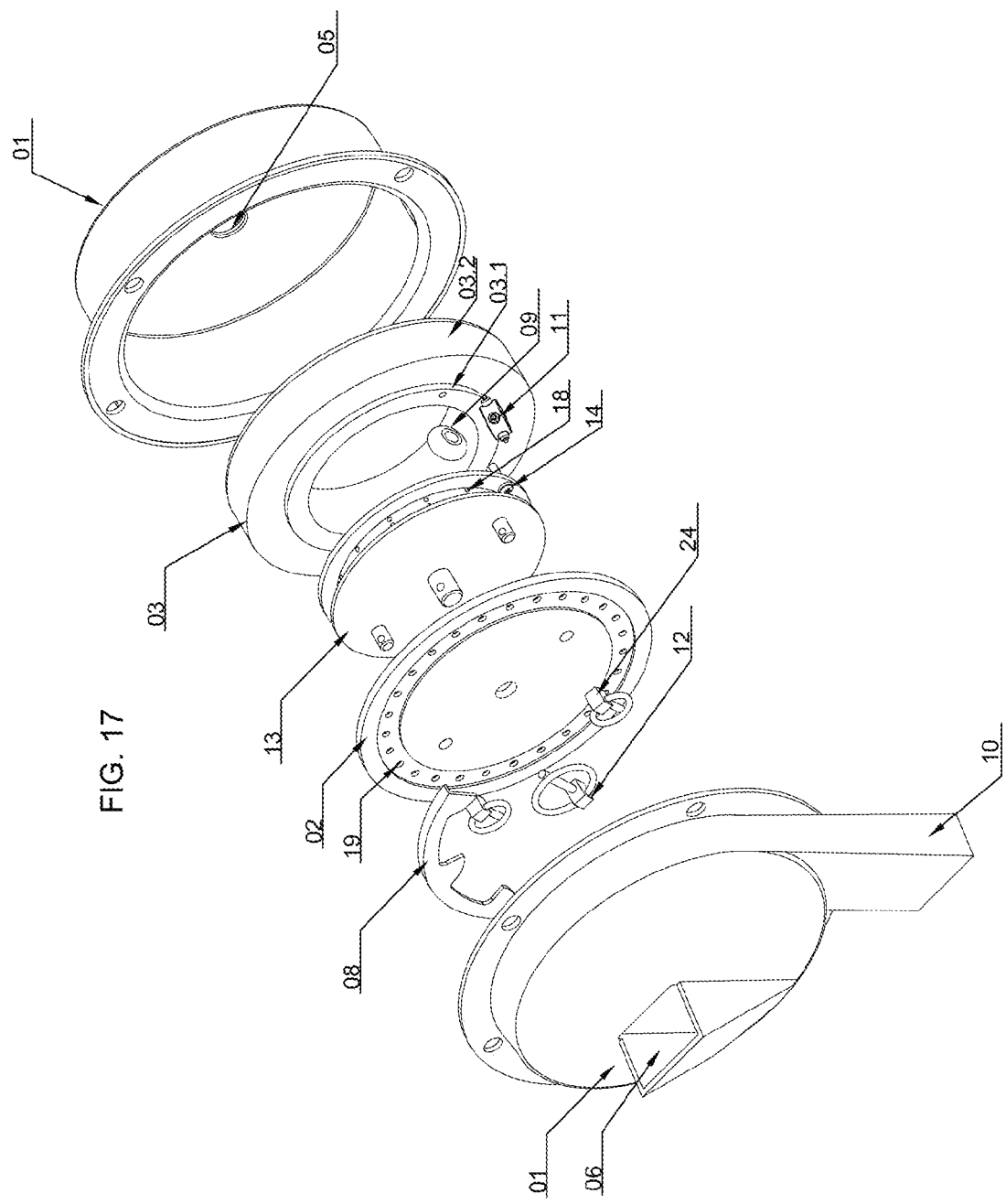
FIG. 17 is an exploded perspective view of a vacuum seed metering device comprising a large diameter torque motor with an annular rotor, wherein the vacuum generating means are connected to the housing through the annular rotor of the torque motor, according to a ninth embodiment of the present invention.
Figure 18:
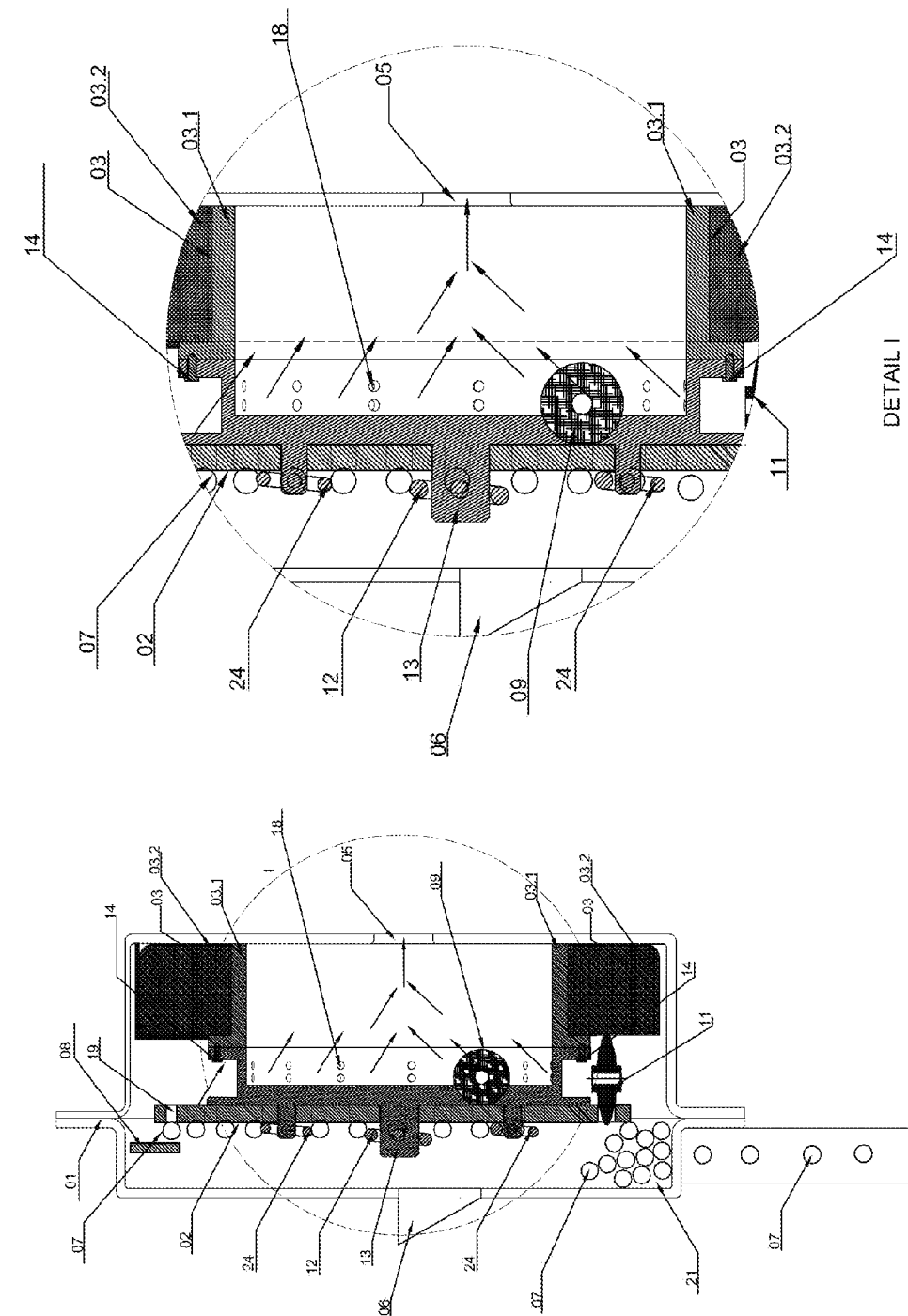
FIG. 18 is a schematic cross-section side view of the vacuum seed metering device of FIG. 17.

FIGS. 17 and 18 show a vacuum seed metering device according to an ninth embodiment of the present invention. Said vacuum seed metering device comprises a cylindrical housing 01, which houses a rotating metering disc 02 coaxially coupled about its central axis to an annular rotor 03.1 of a coaxially arranged large diameter torque motor 03 by means of a hollow hub 13 or other suitable coupling means which allow the passage of air through it. The annular stator 03.2 of the large diameter torque motor 03 is fixed to the interior of the housing 01 by suitable fastening means (not shown). The hollow hub 13 is coupled to the annular rotor 03.1 by rods or pins 14 or other suitable fastening means. The metering disc 02 is coupled to the hollow hub 13 by suitable securing means. In a preferred embodiment, the metering disc 02 is secured to the hollow hub 13 by means of a cotter pin 12 secured about a main central rod of the hollow hub 13 and a plurality of radially displaced lesser pins 24 secured about secondary fastening rods on the hub 13.

The metering disc 02 divides the housing 01 into two chambers; a vacuum chamber, fluidly connected to a vacuum generation means (not shown), and an atmospheric pressure chamber. Seeds 07 are loaded into a reservoir 21 within the atmospheric pressure chamber through a seed inlet 06, which may or may not comprise a hopper and/or closure means (not shown). Vacuum is created in the vacuum chamber by the extraction of air in said chamber by means of a vacuum generating means (not shown) through an air extraction outlet 05. Fluid connection between the vacuum generating means and the vacuum chamber in the housing 01 is achieved through a plurality of orifices or holes 18 in the hollow hub 13 which connects the annular rotor 03.1 of the large diameter torque motor 03 to the metering disc 02. In turn, the annular rotor 03.1 is fluidly connected to the air extraction outlet 05, which is connected to the vacuum generating means (not shown).

The metering disc 02 comprises a plurality of radially spaced holes 19 or other suitable seed retaining means on its outer region. The holes 19 utilize the vacuum generated in the vacuum chamber by the vacuum generating means to capture seeds 07 from the seed reservoir 21 and retain them until the vacuum is interrupted by a wheel 09 or other suitable seed releasing means, releasing the seed 07 from the holes 19 of the metering disc 02, preferably into a seed outlet 10.

In a preferred embodiment the wheel 09 comprises a device arranged to block or isolate the affected holes 19 from the vacuum generated by the vacuum generating means, causing the seed to be released from said affected hole 19. Preferably, the wheel 09 is made from a flexible material, like rubber or other polymeric material, and located on the side of the metering disc 02 opposite to the seeds 07, which can isolate a particular hole 19 from the vacuum source.

The embodiment further comprises a suitable curved plate 08 or other singulating means to prevent the simultaneous retention and discharge of two or more seeds 07 from a single hole 19, by removing excess seeds and returning them to the seed reservoir 21. Additionally, the embodiment further comprises a toothed wheel 11 with a plurality of teeth or projections, or other suitable auxiliary ejector means, arranged in a cavity 17 within the housing 01, which doubles both as a cleaning device for cleaning and removing obstructions in the holes 19 and as an auxiliary means for releasing seeds 07 not properly released by the seed releasing wheel 09. Preferably, the toothed wheel 11 is made from flexible material, like rubber or other polymeric material.

In operation, seeds 07 captured by the metering disc 02, and not removed by the curved plate 08, are carried over to the wheel 09, which in turn releases the seeds 07 from the metering disc 02 and allows them to freely fall through a seed outlet 10, through a conducting means to an opened furrow on the soil or another section of the seeding equipment.

The above embodiments should not to be taken as limiting examples of the invention, as the benefits of the application of a direct drive seed metering device driven by a DC brushless toroidal torque motor, as disclosed herein, in other embodiments of seed metering devices will be apparent to those skilled in the art. Thus, the invention is further suited for its application on other seed metering devices as, for example, devices without a pressure or vacuum source and which utilize other types of seed capturing, retaining and releasing means, such as teeth, cells, cradles and the like.

The invention claimed is:

1. A seed metering device for a row crop sowing machine, comprising
    a seed metering disc rotatable about a central shaft, having a plurality of seed capturing and retaining holes for capturing and retaining the seeds,
    a motor, which drives the seed metering disc,
    releasing means for releasing the seeds from the seed capturing and retaining holes,
    conducting means for conducting the released seeds onto the ground,
    a housing for containing and protecting the metering disc,
    a flexible sealing member contained within the housing, and
    vacuum generating means,
    wherein the motor is an annular hollow-shaft motor coaxially coupled to the metering disc;
    wherein the flexible sealing member is sealingly attached to an inner wall of the housing and sealingly pressed against a face of the metering disc, thereby forming a vacuum chamber, and wherein the vacuum generating means lowers the air pressure on said face of the metering disc so as to capture and retain the seeds within the seed capturing and retaining holes arranged on another face of the metering disc opposite the vacuum chamber;
    wherein the annular hollow-shaft motor is coupled to the seed metering disc by a hollow hub comprising a hollow shaft or tube, and wherein the hollow hub is perforated, fluidly connecting the vacuum chamber to the hollow shaft of the motor coupled to said hollow hub.

2. The metering device according to claim 1, wherein the annular hollow-shaft motor is a direct drive DC brushless motor.

3. The metering device according to claim 1, wherein the seed capturing and retaining holes are located near the outer perimeter of the metering disc and the hole size is determined by the type of seed to be sown, so as to be able to retain the seeds in place until reaching the releasing means.

4. The metering device according to claim 1, wherein the vacuum chamber does not simultaneously overlap with all the seed capturing and retaining holes of the metering disc and wherein the release of the seeds from the seed capturing and retaining holes occurs when a particular hole no longer overlaps with the vacuum chamber.

5. The metering device according to claim 1, wherein the device further comprises singulating means for allowing only one seed to be retained in each capturing and retaining hole.

6. The metering device according to claim 5, wherein the singulating means comprise a plate, parallel to the metering disc and spaced apart so as to allow only one seed to be retained in each capturing and retaining holes.

7. The metering device according to claim 1, wherein the conducting means for conducting the released seeds onto the ground comprises a tube for allowing the seeds to freely reach the soil by gravity, into an opened furrow in the soil.

8. The metering device according to claim 1, wherein the housing comprises a rotatable toothed wheel with a plurality of teeth or projections, which engage with the seed capturing and retaining holes as the disc rotates, removing obstructions and releasing seeds stuck in said the seed capturing and retaining holes.

9. A seed metering device for a row crop sowing machine, comprising
    a seed metering disc rotatable about a central shaft, having a plurality of seed capturing and retaining holes for capturing and retaining the seeds,
    a motor, which drives the seed metering disc,
    releasing means for releasing the seeds from the seed capturing and retaining holes,
    conducting means for conducting the released seeds onto the ground,
    a housing for containing and protecting the metering disc,
    a flexible sealing member contained within the housing, and
    vacuum generating means,
    wherein the motor is an annular hollow-shaft motor coaxially coupled to the metering disc;
    wherein the flexible sealing member is sealingly attached to an inner wall of the housing and sealingly pressed against a face of the metering disc, thereby forming a vacuum chamber, and wherein the vacuum generating means lowers the air pressure on said face of the metering disc so as to capture and retain the seeds within the seed capturing and retaining holes arranged on another face of the metering disc opposite the vacuum chamber;

wherein the vacuum generating means is fluidly connected to the vacuum chamber through the hollow shaft of the motor and through a perforated hollow hub.

10. The metering device according to claim 9, wherein the annular hollow-shaft motor is a direct drive DC brushless motor.

11. The metering device according to claim 9, wherein the seed capturing and retaining holes are located near the outer perimeter of the metering disc and the hole size is determined by the type of seed to be sown, so as to be able to retain the seeds in place until reaching the releasing means.

12. The metering device according to claim 9, wherein the vacuum chamber does not simultaneously overlap with all the seed capturing and retaining holes of the metering disc and wherein the release of the seeds from the seed capturing and retaining holes occurs when a particular hole no longer overlaps with the vacuum chamber.

13. The metering device according to claim 9, wherein the device further comprises singulating means for allowing only one seed to be retained in each capturing and retaining hole.

14. The metering device according to claim 13, wherein the singulating means comprise a plate, parallel to the metering disc and spaced apart so as to allow only one seed to be retained in each capturing and retaining holes.

15. The metering device according to claim 9, wherein the conducting means for conducting the released seeds onto the ground comprises a tube for allowing the seeds to freely reach the soil by gravity, into an opened furrow in the soil.

16. The metering device according to claim 9, wherein the housing comprises a rotatable toothed wheel with a plurality of teeth or projections, which engage with the seed capturing and retaining holes as the disc rotates, removing obstructions and releasing seeds stuck in said the seed capturing and retaining holes.

* * * * *